(12) United States Patent
Sugishita

(10) Patent No.: US 11,273,859 B2
(45) Date of Patent: Mar. 15, 2022

(54) STEERING DEVICE

(71) Applicant: NSK Ltd., Tokyo (JP)

(72) Inventor: Suguru Sugishita, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 17/041,866

(22) PCT Filed: Mar. 27, 2019

(86) PCT No.: PCT/JP2019/013375
§ 371 (c)(1),
(2) Date: Sep. 25, 2020

(87) PCT Pub. No.: WO2019/189474
PCT Pub. Date: Oct. 3, 2019

(65) Prior Publication Data
US 2021/0129890 A1    May 6, 2021

(30) Foreign Application Priority Data

Mar. 27, 2018 (JP) ............................. JP2018-059631
Apr. 6, 2018 (JP) ............................. JP2018-074164
Apr. 11, 2018 (JP) ............................. JP2018-075911
Aug. 24, 2018 (JP) ............................. JP2018-156901

(51) Int. Cl.
| | |
|---|---|
| *B62D 1/18* | (2006.01) |
| *B62D 1/189* | (2006.01) |
| *B62D 1/184* | (2006.01) |
| *B62D 1/185* | (2006.01) |
| *B62D 5/04* | (2006.01) |

(52) U.S. Cl.
CPC ............... *B62D 1/18* (2013.01); *B62D 1/184* (2013.01); *B62D 1/189* (2013.01); *B62D 1/185* (2013.01); *B62D 5/0409* (2013.01)

(58) Field of Classification Search
CPC .................................. B62D 1/18; B62D 1/189
See application file for complete search history.

(56) References Cited

U.S. PATENT DOCUMENTS

2018/0022376 A1    1/2018 Sugishita

FOREIGN PATENT DOCUMENTS

| JP | 2014-83906 A | 5/2014 |
|---|---|---|
| JP | 2014-172569 A | 9/2014 |

(Continued)

OTHER PUBLICATIONS

International Search Report (PCT/ISA/210) issued in PCT Application No. PCT/JP2019/013375 dated Jun. 4, 2019 with English translation (four (4) pages).

(Continued)

*Primary Examiner* — Nicole T Verley
(74) *Attorney, Agent, or Firm* — Crowell & Moring LLP

(57) ABSTRACT

Please substitute the new Abstract submitted herewith for the original Abstract: Provided is a steering device in which a pair of tension springs is arranged on both outer sides in the width direction of a pair of support plate portions of a support bracket. The pair of tension springs applies a force directed diagonally upward toward the front to a base portion of an adjustment lever and a pressing plate arranged at both end portions of an adjustment rod, and elastically presses the front side surface of an engaging convex portion of a driven-side cam against a front side edge of a long hole in the up-down direction.

4 Claims, 25 Drawing Sheets

(56) References Cited

FOREIGN PATENT DOCUMENTS

| | | |
|---|---|---|
| JP | 2015-214291 A | 12/2015 |
| JP | 2016-94950 A | 5/2016 |
| JP | 2017-1569 A | 1/2017 |
| JP | 2017-81516 A | 5/2017 |
| JP | 2018-127041 A | 8/2018 |
| KR | 10-1465496 B1 | 11/2014 |
| WO | WO 2016/186144 A1 | 11/2016 |

OTHER PUBLICATIONS

Japanese-language Written Opinion (PCT/ISA/237) issued in PCT Application No. PCT/JP2019/013375 dated Jun. 4, 2019 (five (5) pages).

(A)

(B)

PRIOR ART

STEERING DEVICE

TECHNICAL FIELD

The present invention relates to a steering device including a steering wheel position adjusting device.

BACKGROUND ART

As illustrated in FIG. 23, a steering device transmits rotation of a steering wheel 1 to an input shaft 3 of a steering gear unit 2, pushes and pulls a pair of left and right tie rods 4 based on the rotation of the input shaft 3, and applies a steering angle to the front wheels. The steering device includes a steering shaft 5 that supports the steering wheel 1 at a rear-end portion thereof, and a cylindrical-shaped steering column 6 that rotatably supports the steering shaft 5 in a state of the steering shaft 5 being inserted in the axial direction inside of the steering column 6. A front end portion of the steering shaft 5 is connected to a rear-end portion of an intermediate shaft 8 via a universal joint 7, and the front end portion of the intermediate shaft 8 is connected to the input shaft 3 via another universal joint 9. Note that the front-rear direction, the width direction, and the up-down direction mean the front-rear direction, the width direction, and the up-down direction of the vehicle unless otherwise specified.

The steering device may include a tilt mechanism for adjusting the vertical position of the steering wheel 1 and a telescopic mechanism for adjusting the front-rear position of the steering wheel 1. In the illustrated structure, a gear housing 10 fixed to the front portion of the steering column 6 is pivotally supported by a tilt shaft 12 arranged in the width direction with respect to the vehicle body 11 so as to be able to pivot. A displacement bracket 13 is provided below the steering column 6, and a support bracket 14 is arranged at a position sandwiching the displacement bracket 13 from both sides in the width direction. The support bracket 14 has long holes in the up-down direction 15 that extend in the up-down direction, and the displacement bracket 13 has long holes in the front-rear direction 16 that extend in the front-rear direction. An adjustment rod 17 is arranged so as to be inserted in the width direction through the long holes in the up-down direction 15 and the long holes in the front-rear direction 16. The steering shaft 5 and the steering column 6 have a structure capable of being expanded or contracted. By adjusting the clamping force with which the support bracket 14 holds the displacement bracket 13 from both sides in the width direction, the vertical position and the front-rear position of the steering wheel 1 may be adjusted.

The structure of the steering device including the steering wheel position adjusting device will be described in detail with reference to FIGS. 24 and 25. FIG. 25 illustrates a structure similar to that described in JP 2015-214291A.

The steering column 6 includes an outer column 18 arranged on the rear side and an inner column 19 arranged on the front side, and is configured so that the front portion of the outer column 18 and the rear portion of the inner column 19 are fitted to each other so that relative displacement in the axial direction is possible, and so that the entire length may be expanded or contracted. The outer column 18 is provided with a slit 20 in the front portion thereof, and the inner diameter of the front portion of the outer column 18 may be elastically expanded and contracted. The outer column 18 is provided with a pair of clamped plate portions 21a, 21b that constitute the displacement bracket 13 and that are located at portions sandwiching the slit 20 from both sides in the width direction. The pair of clamped plate portions 21a, 21b have long holes in the front-rear direction 16a, 16b. The support bracket 14 includes a pair of support plate portions 22a, 22b, and the pair of support plate portions 22a, 22b have long holes in the up-down direction 15a, 15b. The adjustment rod 17 is arranged so as to be inserted through the pair of long holes in the up-down direction 15a, 15b and the pair of long holes in the front-rear direction 16a, 16b.

A base portion of an adjustment lever 23 is fixed to one end side of the adjustment rod 17 in a portion that protrudes from an outer-side surface of one supporting plate portion 22a of the pair of supporting plate portions 22a, 22b. A cam device 24 is arranged between the outer-side surface of the one support plate portion 22a and the base portion of the adjustment lever 23. The cam device 24 includes a driving-side cam 25 and a driven-side cam 26, and the dimension in the width direction may be expanded or contracted based on relative rotation of these cams. The driven-side cam 26 includes an engaging convex portion 27 on its inner-side surface, and the engaging convex portion 27 engages with the long hole in the up-down direction 15a of the one support plate portion 22a so as to be capable of displacement only along the long hole in the up-down direction 15a. The driving-side cam 25 may be rotated together with the adjustment rod 17 by the adjustment lever 23. On the other end side of the adjustment rod 17, a nut 28 is screwed to a portion protruding from the outer-side surface of the other support plate portion 22b of the pair of support plate portions 22a, 22b. A thrust bearing 29 and a pressing plate 30 are arranged between the outer-side surface of the other support plate portion 22b and the nut 28.

When the adjustment lever 23 is pivotally operated in a specified direction in order to adjust the position of the steering wheel 1, the driving-side cam 25 rotates in the unlocking direction, the dimension in the width direction of the cam device 24 is reduced, and the space between the driven-side cam 26 and the pressure plate 30 is increased. As a result, the surface pressure at the contact portion between the inner-side surfaces of the support plate portions 22a, 22b and the outer-side surfaces of the clamped plate portions 21a, 21b is reduced or disappears, while at the same time, the inner diameter of the front portion of the outer column 18 elastically expands, and the surface pressure at the contact portion between the inner circumferential surface of the front portion of the outer column 18 and the outer circumferential surface of the rear portion of the inner column 19 is reduced. In this unclamped state, the vertical position and front-rear position of the steering wheel 1 may be adjusted within a range in which the adjustment rod 17 is able to move inside the long holes in the up-down direction 15a, 15b and the long holes in the front-rear direction 16a, 16b.

After the steering wheel 1 is moved to the desired position, the adjustment lever 23 is pivotally operated in a direction opposite to the specified direction. As a result, the driving-side cam 25 rotates in the locking direction, the dimension in the width direction of the cam device 24 increases, and the distance between the inner-side surfaces of the pair of support plate portions 22a, 22b decreases. As a result, the surface pressure at the contact portion between the inner-side surfaces of the support plate portions 22a, 22b and the outer-side surfaces of the clamped plate portions 21a, 21b increases, while at the same time, the inner diameter of the front portion of the outer column 18 is elastically reduced, and surface pressure at the contract portion between the inner circumferential surface of the front portion of the outer column 18 and the outer circumferential surface of the rear portion of the inner column 19 increases. In this clamped state, the adjusted vertical position and front-rear position of the steering wheel 1 are maintained.

The steering device may include a spring 31 in order to prevent the steering column 6 from tilting in a direction in which the steering wheel 1 drops when the clamping force is released. One end portion of the spring 31 is locked to the support bracket 14, and the other end portion of the spring 31 elastically comes in contact with the lower surface of the pressing plate 30. The spring 31 applies an upward force to the other end portion of the adjustment rod 17 via the pressing plate 30 in a direction substantially along the extending direction of the long hole in the up-down direction 15*b*. Therefore, when adjusting the position of the steering wheel 1, the tilting of the steering column 6 is prevented, and the vertical position of the steering wheel 1 may be adjusted with a light force.

CITATION LIST

Patent Literature

[Patent Literature 1] JP 2015-214291A

SUMMARY OF THE INVENTION

Technical Problem

In the conventional structure, the spring 31 applies an upward force to the adjustment rod 17 substantially along the extension direction of the long hole in the up-down direction 15*b*, so the adjustment rod 17 is pressed against the upper surface of the inner circumferential surfaces of the long holes in the front-rear direction 16*a*, 16*b*. Therefore, the sliding resistance between the outer circumferential surface of the adjustment rod 17 and the upper surfaces of the long holes in the front-rear direction 16*a*, 16*b* increases, and the force required to adjust the front-rear position of the steering wheel 1 increases. Therefore, the smoothness of the work of adjusting the front-rear position of the steering wheel 1 may be impaired. In particular, in a state in which the steering wheel 1 is moved downward, the amount of bending of the spring 31 is large, and the force with which the adjustment rod 17 presses the upper surfaces of the long holes in the front-rear direction 16*a*, 16*b* is also increased, so a large force is required for adjusting the front-rear position of the steering wheel 1.

Moreover, in the conventional structure, a spring 31 is not installed on the one end portion side of the adjustment rod 17, but is installed only on the other end portion side of the adjustment rod 17. Therefore, when the clamping force of the support bracket clamping the displacement bracket from both sides in the width direction is released, an upward force is only applied to the pressing plate 30 that is arranged on the other end portion side of the adjustment rod 17, so in some cases the adjustment rod 17 may tilt up and down. Therefore, when adjusting the vertical position of the steering wheel 1, the adjustment rod 17 may not be able to smoothly displace in the long holes in the up-down direction 15*a*, 15*b*, and the adjustment lever 23 may vibrate up and down (move wildly).

For steering device in general, in order to adjust the position of the steering wheel, it is also required that when the support bracket releases the clamping force that clamps the displacement bracket from both sides in the width direction, the steering wheel does not suddenly jump or drop.

In view of the circumstances described above, an object of the present invention is to provide a steering device in which the force required to adjust the vertical position of the steering wheel is reduced, and the vertical position of the steering wheel may be adjusted smoothly, and furthermore, the smoothness of the work of adjusting the front-rear position of the steering wheel is ensured.

Solution to Problem

The steering device according to the present invention includes a steering column, a displacement bracket, a support bracket, an adjustment rod, a cam device, and an adjustment lever.

The steering column rotatably supports a steering shaft that is inserted in the axial direction through the inside thereof, has a tubular shape, is attached to a vehicle body or a member that can be fixed to a vehicle body, and is capable of pivotal displacement around a tilt shaft that is arranged in the width direction that supports the steering column or a member that is fixed to the steering column. The steering column may be configured by an inner column and an outer column that is arranged on the rear side of the inner column and that is fitted to the inner column so as to be capable of relative displacement in the axial direction.

The displacement bracket is provided in a part of the steering column and has a column-side through hole penetrating in the width direction of the displacement bracket. In a case in which the steering device of the present invention includes a telescopic mechanism, the displacement bracket may be provided on a part of the outer column, and the column side through hole may be configured by a long hole in the front-rear direction that extends in the front-rear direction (long hole for telescopic adjustment). In a case in which the steering device of the present invention does not include a telescopic mechanism, the column-side through hole may be configured by a circular hole.

The support bracket has: an installation plate portion; a pair of support plate portions that are connected to the installation plate portion and arranged on both sides in the width direction of the displacement bracket; and a pair of long holes in the up-down direction that is arranged in the pair of support plate portions and extends in the up-down direction (long holes for tilt adjustment).

The adjustment rod is inserted in the width direction through the column side through hole and the pair of long holes in the up-down direction.

The cam device has a driving-side cam and a driven-side cam arranged on one end side of the adjustment rod around a portion protruding from an outer-side surface of one support plate portion of the pair of support plate portions.

The adjustment lever has a base portion fixed to the driving-side cam.

The driven-side cam includes an engaging convex portion on an inner-side surface thereof, and the engaging convex portion engages with one of the pair of long holes in the up-down direction and is capable of displacing along the one long hole in the up-down direction.

Particularly, in the steering device of the present invention, a pair of tension springs is arranged on both outer sides in the width direction of the pair of support plate portions. One tension spring of the pair of tension springs spans between the support bracket and the base portion of the adjustment lever; and the other tension spring of the pair of tension springs spans between the support bracket and a locked portion provided on a portion of the other end side of the adjustment rod that protrudes from the outer-side surface of the other support plate portion of the pair of support plate portions.

In a state in which the adjustment lever is pivotally operated in a direction to reduce a dimension in the width direction of the cam device, the pair of tension springs apply a force having a magnitude identical to each other to the base portion of the adjustment lever and the locked portion in acting directions directed diagonally upward toward the front at identical angles with respect to a center axis of the steering column. Accordingly, the front side surface of the engaging convex portion is elastically pressed against the front side edge of the one long hole in the up-down direction.

The identical angle includes substantially the identical angle, and the identical magnitude includes substantially the identical magnitude.

The locked portion may be configured by the other end portion of the adjustment rod or by a member arranged on the other end side of the adjustment rod. The function and type of the member are not limited. Examples of the member include a pressing plate, a thrust bearing, a nut and the like.

In the steering device of the present invention, both a structure in which the adjustment rod rotates in synchronization with the driving-side cam and a structure in which only the driving-side cam rotates but the adjustment rod does not rotate may be adopted.

In the steering device of the present invention, the acting direction may be directed further upward than a direction of an imaginary straight line orthogonal to the tilt shaft and the adjustment rod.

In the steering device of the present invention, the pair of tension springs may be configured by coil springs having a coil portion. In this case, at least one of the tension springs may include a damper member on the inner side or outer side of the coil portion.

Effect of the Invention

With the steering device of the present invention, it is possible to reduce the force required to adjust the vertical position of a steering wheel, adjustment of the vertical position of the steering wheel may be performed smoothly, and smoothness of the work of adjusting the front-rear position of the steering wheel may be ensured.

BRIEF DESCRIPTION OF THE DRAWINGS

FIG. 12A is a front view of the driving-side cam, FIG. 12B is a rear view of the driving-side cam, FIG. 12C is a front view of the driven-side cam, and FIG. 12D is a rear view of the driven-side cam.

FIG. 13A is a top view of the pressing plate, and FIG. 13B is a front view of the pressing plate.

FIG. 19A is a perspective view of the tension spring, and FIG. 19B is an end view of the tension spring.

FIG. 22A is a top view of the pressing plate, and FIG. 22B is a front view of the pressing plate.

DESCRIPTION OF THE EMBODIMENTS

FIRST EXAMPLE

Figure 14:
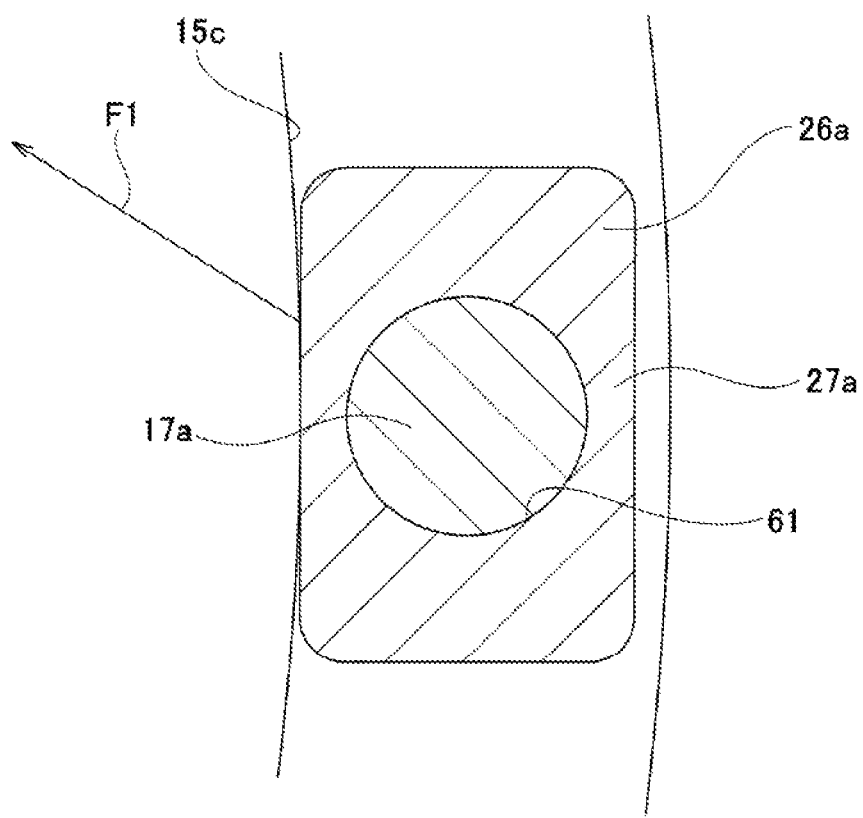
FIG. 14 is a cross-sectional view taken along section line B-B in FIG. 10.
Figure 15:
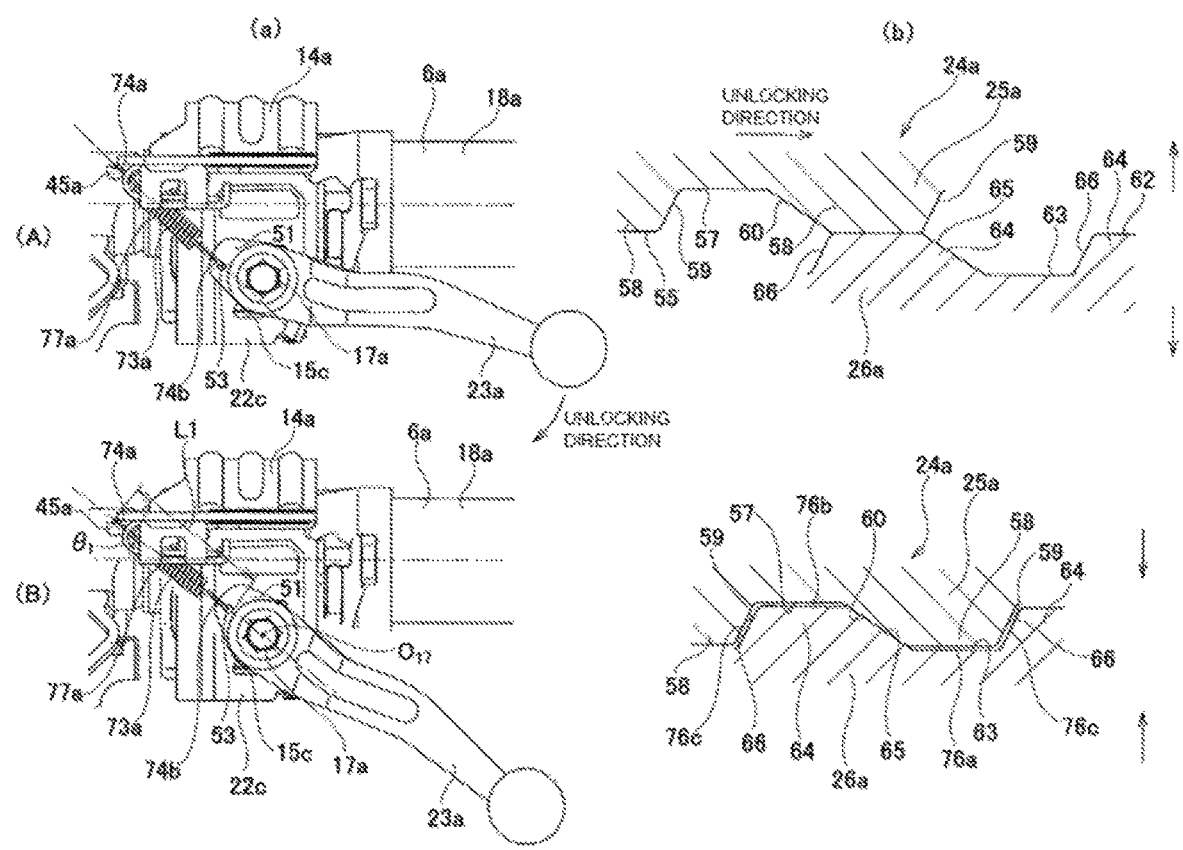
FIGS. 15A and 15B are explanatory views of the relationship between a pivot position of the adjustment lever and an engaged state of the cam device in the steering device of the first example; where (a) of FIG. 15A illustrates the pivot position of the adjustment lever in a locked state; (b) of FIG. 15A illustrates an engaged state between the driving-side cam and the driven-side cam in a locked state; (a) of FIG. 15B illustrates the pivot position of the adjustment lever in an unlocked state; and (b) of FIG. 15B illustrates an engaged state between the driving-side cam and the driven-side cam in an unlocked state.
Figure 23:
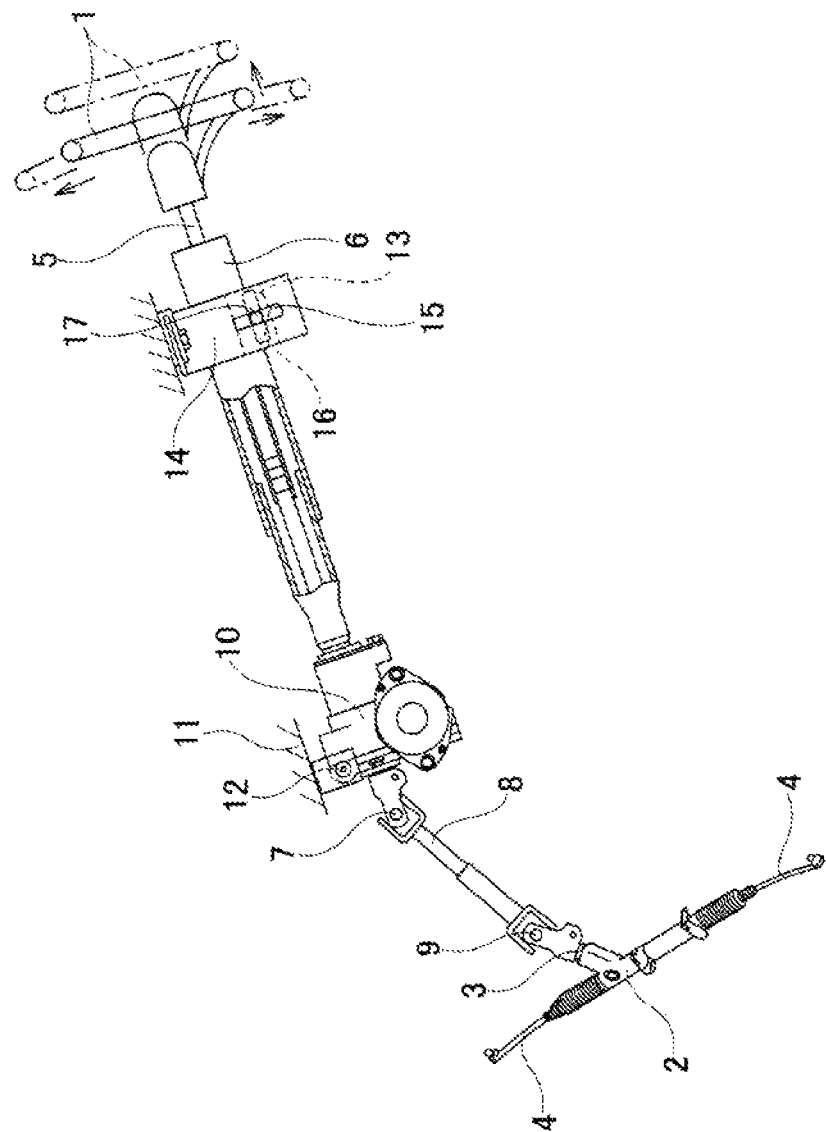
FIG. 23 is a schematic diagram of an example of a conventional steering device to which the present invention may be applied.
Figure 24:
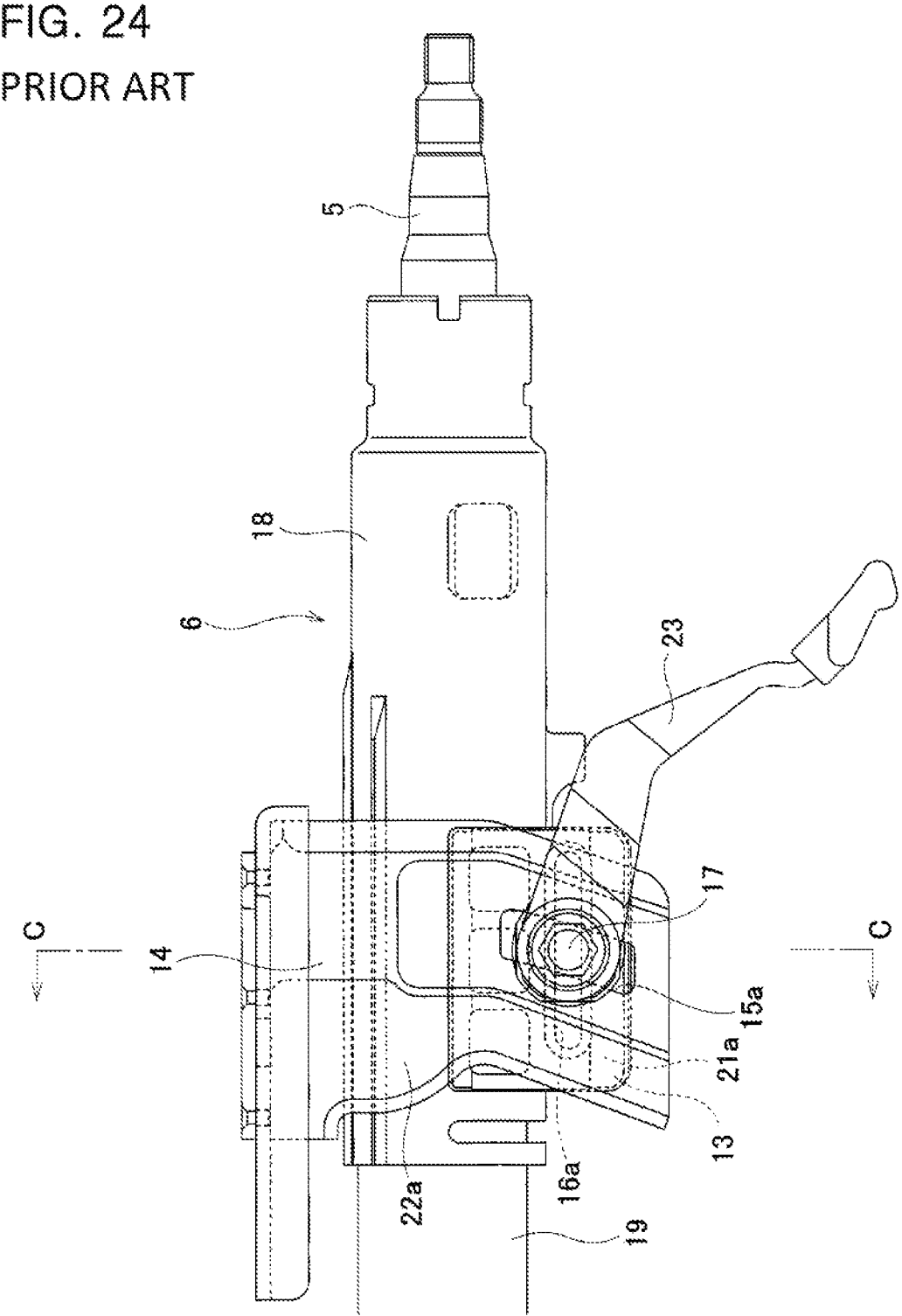
FIG. 24 is a partial side view of an example of a conventional steering wheel position adjusting device to which the present invention may be applied.
Figure 25:
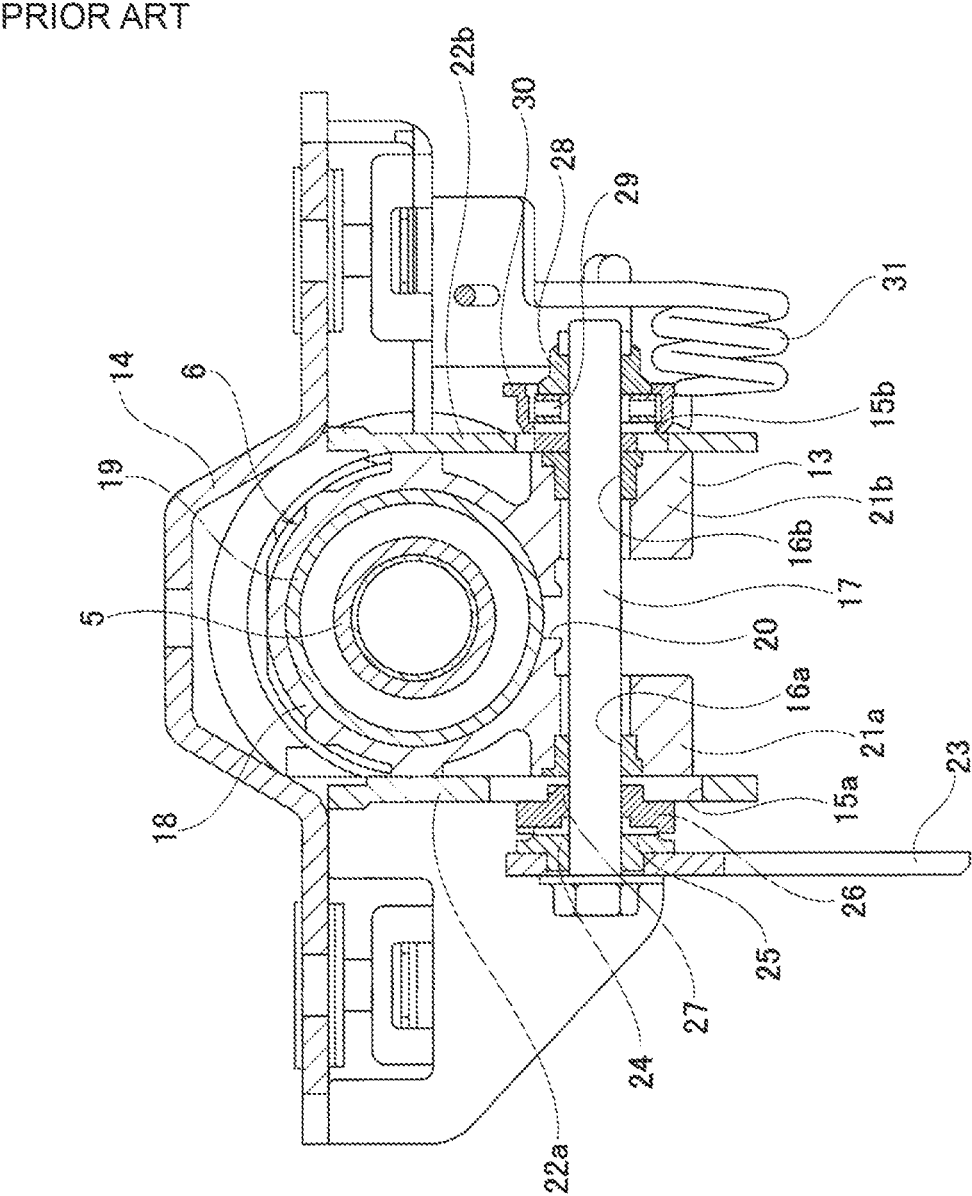
FIG. 25 is a cross-sectional view taken along section line C-C in FIG. 24.

A first example of an embodiment of the present invention will be described with reference to FIGS. 1 to 15B. Note that FIGS. 1 to 10 and FIG. 15A illustrate a state in which an adjustment lever 23a is pivotally operated to a locked position where a position of a steering wheel 1 (see FIG. 23) is maintained, and FIG. 15B illustrates a state in which the adjustment lever 23a is pivotally operated to an unlocked position where the position of the steering wheel 1 may be adjusted.

The steering device includes: a steering shaft 5a that supports a steering wheel 1 on a rear-end portion thereof; and a tubular steering column 6a supported by a vehicle body 11 (see FIG. 23) and rotatably supports the steering shaft 5a via a plurality of rolling bearings in a state where the steering shaft 5a is inserted in the axial direction through the inside of the steering column 6a.

A gear housing 10a of an electric assist device is fixed to a front-end portion of the steering column 6a. The gear housing 10a is supported by a lower bracket 32 that may be fixed to the vehicle body 11, and is supported so as to be able to pivot about a tilt shaft 12a arranged in the width direction. An electric motor (not illustrated) is supported by the gear housing 10a, and the output torque of the electric motor is applied to the steering shaft 5a via a reduction mechanism arranged inside the gear housing 10a. As a result, the force required to operate the steering wheel 1 may be reduced.

The steering device of this example includes: a telescopic mechanism for adjusting the front-rear position of the steering wheel 1; and a tilt mechanism for adjusting the vertical position of the steering wheel 1 according to the physique and driving posture of the driver.

The steering column 6a is configured with the front portion of the outer column 18a arranged on the rear side (upper side) fitted to the rear portion of the inner column 19a arranged on the front side (lower side) so that relative displacement in the axial direction is possible, and so as to be able to extend or contract over the entire length. The outer column 18a is supported so as to be movable in the front-rear direction with respect to the support bracket 14a. The steering shaft 5a has a structure in which an inner shaft 33 and an outer shaft 34 are combined so as to be able to transmit torque and extend and contract by a spline engagement or the like. The telescopic mechanism is configured by such a structure.

The tilt mechanism is configured so that the steering column 6a and the gear housing 10a are supported with respect to the vehicle body 11 so as to be able to pivotally displace about the tilt shaft 12a, and the outer column 18a is supported with respect to the support bracket 14a so as to be able to move in the up-down direction.

Figure 10:
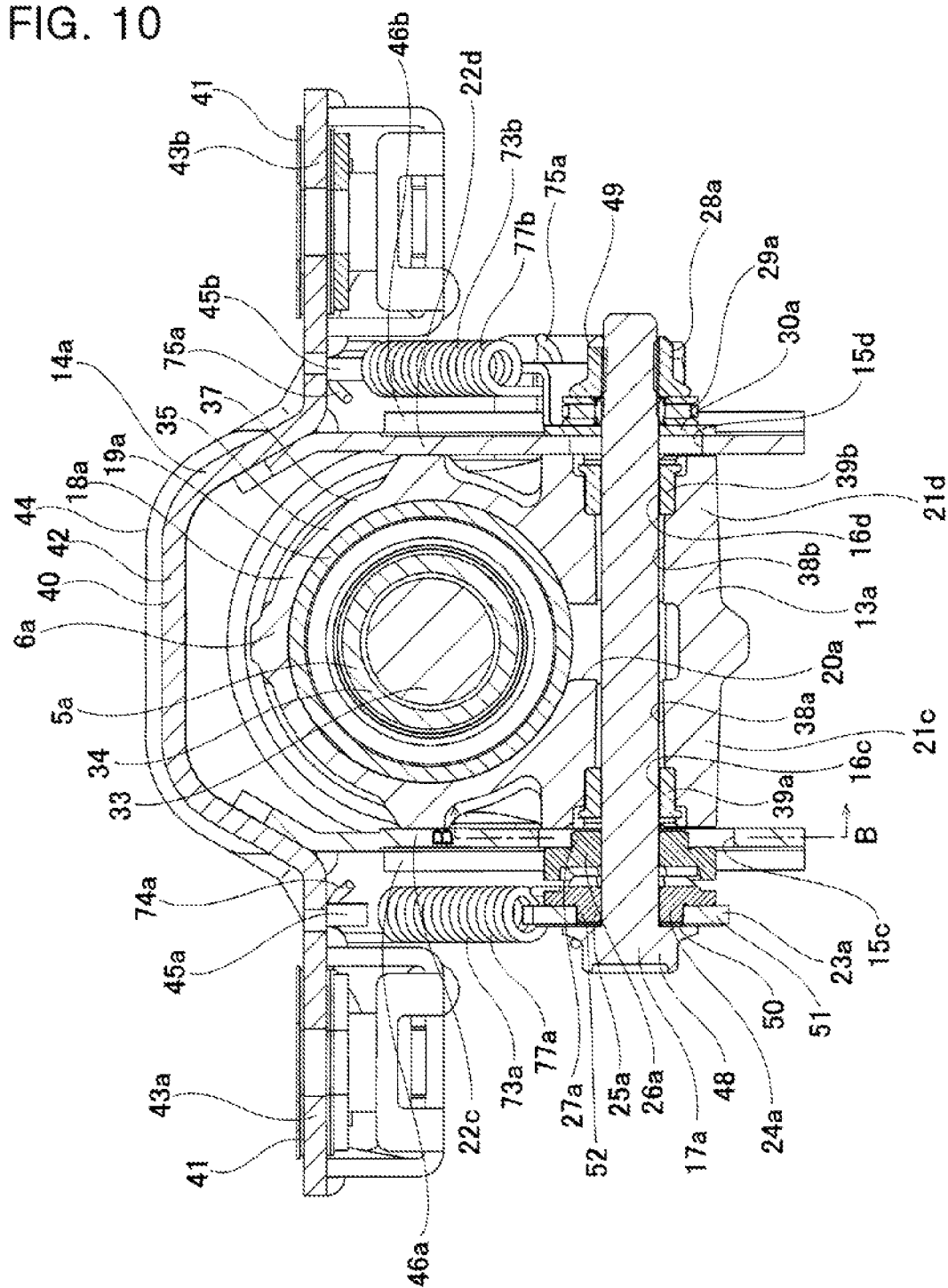
FIG. 10 is a cross-sectional view taken along the section line A-A in FIG. 6 of the steering device of the first example.
Figure 11:
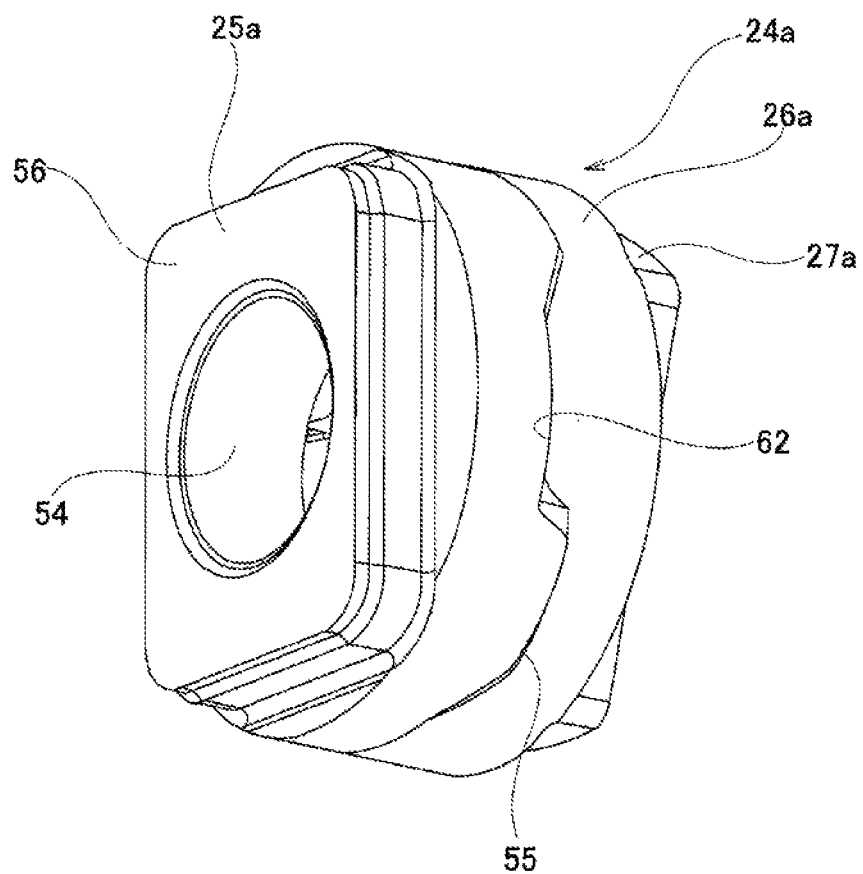
FIG. 11 is a perspective view of a cam device assembled in the steering device of the first example.
Figure 12:
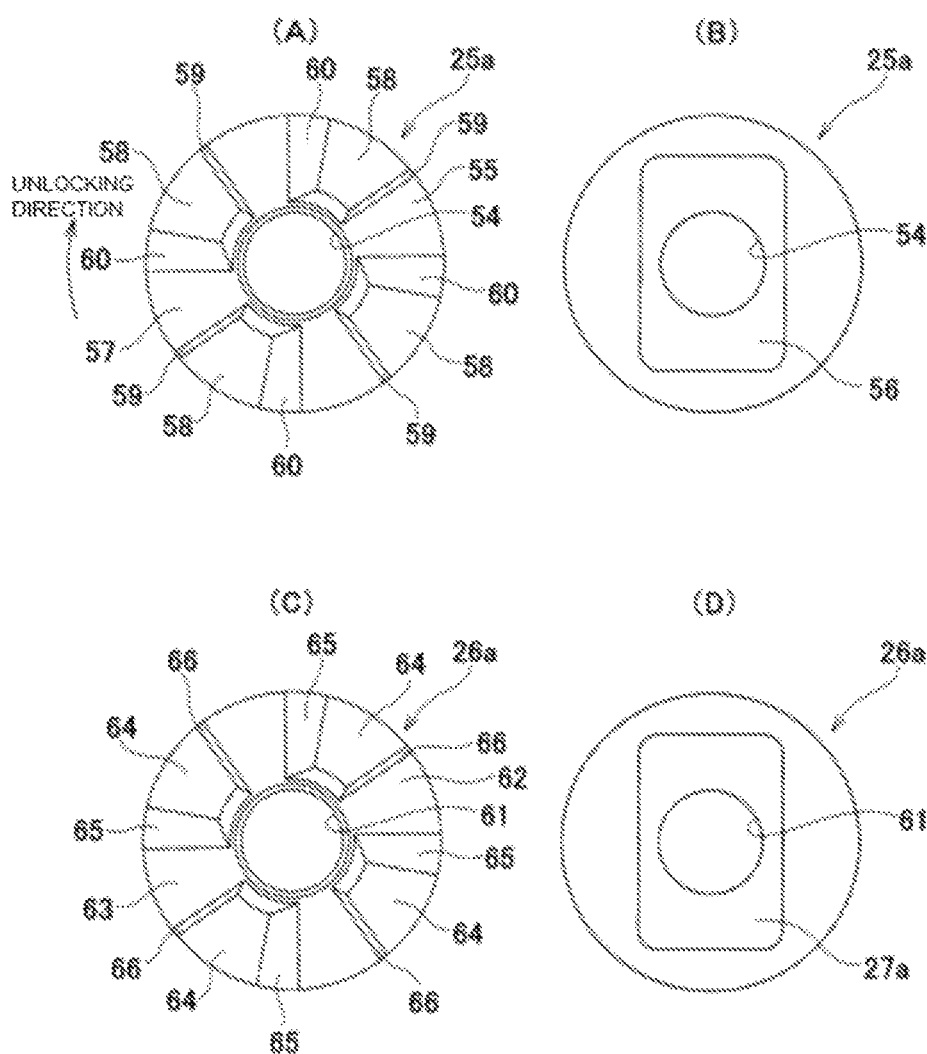
FIGS. 12A to 12D schematically illustrate a driving-side cam and a driven-side cam of the cam device assembled in the steering device of the first example, where

The outer column 18a is configured by a clamped portion 35 made of a light alloy such as an aluminum-based alloy, a magnesium-based alloy, or the like and arranged in the first half portion, and a tubular portion 36 made of an iron-based alloy such as carbon steel or the like, arranged in the rear half portion, and coupled with the clamped portion 35 in the axial direction. The clamped portion 35 is supported with respect to the support bracket 14a so as to be able to move in the front-rear direction and the up-down direction. More specifically, the clamped portion 35 of the outer column 18a includes a column fitting portion 37 in the upper half portion and a displacement bracket 13a in the lower half portion thereof. As illustrated in FIG. 10, the column fitting portion 37 is externally fitted to the rear portion of the inner column 19a, and has a slit 20a in the lower end portion thereof that extends in the axial direction. In this example, the displacement bracket 13a includes a pair of clamped plate portions 21c, 21d arranged below the column fitting portion 37 and on both sides in the width direction of the slit 20a. The lower end portions of the pair of clamped plate portions 21c, 21d are connected in the width direction.

The pair of clamped plate portions 21c, 21d are provided with long holes in the front-rear direction (telescopic adjustment holes) 16c, 16d that penetrate in the width direction and extend in the front-rear direction. In the illustrated example, the long holes in the front-rear direction 16c, 16d are configured by lower holes 38a, 38b formed in the clamped plate portions 21c, 21d, and the inner surfaces of long tubular sleeves 39a, 39b made of synthetic resin and mounted inside the outer half portions in the width direction of the lower holes 38a, 38b. The sleeves 39a, 39b are made of a synthetic resin such as a polyamide resin, a polyacetal resin, a polytetrafluoroethylene resin or the like having excellent slidability.

The support bracket 14a has: an installation plate portion 40 that is made of a metal plate having sufficient rigidity such as steel, an aluminum alloy, or the like; a pair of support plate portions 22c, 22d connected to the installation plate portion 40 and arranged on both sides in the width direction of the displacement bracket 13a; and a pair of long holes in the up-down direction (tilt adjustment holes) 15c, 15d provided in the pair of support plate portions 22c, 22d and extending in the up-down direction.

The installation plate portion 40 is locked to a locking capsule 41 that is supported by and fixed to the vehicle body so as to be detachable toward the front. The installation plate portion 40 is normally supported by the vehicle body 11 via the locking capsule 41; however, at the time of a collision accident, the installation plate portion 40 is separated from the locking capsule 41 toward the front due to impact of the secondary collision, and forward displacement of the outer column 18a is allowed.

The installation plate portion 40 includes a bridge portion 42 arranged in the center portion in the width direction and a pair of side plate portions 43a, 43b arranged on both side portions in the width direction. The bridge portion 42 has an inverted U-shaped cross section and is arranged above the clamped portion 35 of the outer column 18a. The bridge portion 42 includes a plurality (three in the illustrated example) of ribs 44 arranged in a state of being separated in the front-rear direction, and the rigidity thereof is ensured. Each of the pair of side plate portions 43a, 43b is has a flat plate shape and has a locking notch for locking the locking capsule 41 that is opened at the rear end edge thereof. Each of the pair of side plate portions 43a, 43b includes a substantially L-shaped locking arm portion 45a, 45b at the inner end portion in the width direction of the front end portion thereof. The locking arm portions 45a, 45b have a shape so as to be bent downward at substantially right angles from the inner end portions in the width direction of the front end portions of the pair of side plate portions 43a, 43b, and project forward from the lower end portions thereof. It is preferable that the shapes of the locking arm portions 45a, 45b and the formation positions thereof be symmetrical with respect to the width direction.

The upper end portions of the pair of support plate portions 22c, 22d are fixed by welding to both end portions in the width direction of the lower surface of the bridge portion 42. The pair of support plate portions 22c, 22d are arranged substantially parallel to each other on both sides in the width direction of the clamped portion 35 of the outer column 18a. In this example, the pair of support plate portions 22c, 22d are provided with a pair of long holes in the up-down direction 15c, 15d that extend in the up-down direction in the shape of a partial arc centered on the tilt shaft 12a. Moreover, reinforcing ridges 46a, 46b extending in the up-down direction are provided on the front end portions of the pair of support plate portions 22c, 22d. The upper end portions of the reinforcing ridges 46a, 46b are not continuous with the bridge portion 42. In the present example, the tension springs 73a, 73b are arranged on both outer sides in the width direction of the pair of support plate portions 22c, 22d, so in order to maintain the section modulus while suppressing the amount of protrusion to the outside in the width direction, the reinforcing ridges 46a, 46b have a circular arc-shaped cross section in which the front end portions thereof are folded back inward in the width direction. Bending plate portions 47a, 47b that extend in the up-down direction and are bent at a substantially right angle toward the outer side in the width direction are provided at the rear-end portions of the pair of support plate portions 22c, 22d. The reinforcing ridges 46a, 46 and the bending plate portions 47a, 47b are provided in order to increase the bending rigidity (torsion strength) of the support plate portions 22c, 22d. The shape of the long holes in the up-down direction is not limited to a partial arc shape centered on the tilt shaft, and alternatively, a straight shape that extends in a direction toward the rear while extending upward may be employed.

As illustrated in FIG. 10, the adjustment rod 17a is arranged so as to be inserted in the width direction through the pair of long holes in the front-rear direction 16c, 16d and the pair of long holes in the up-down direction 15c, 15d. The adjustment rod 17a includes a head portion 48 at one end portion thereof, and a male screw portion 49 at the other end portion thereof. A disc spring 50, the adjustment lever 23a, and the cam device 24a are arranged in that order from the outer side in the width direction on one end side of the adjustment rod 17a around a portion protruding from the outer-side surface of one support plate portion 22c of the pair of support plate portions 22c, 22s, or in other words, between the head portion 48 and the outer side surface of the one support plate portion 22c. A nut 28a, a thrust bearing 29a, and a pressing plate 30a are arranged in that order from the outer side in the width direction on the other end side of the adjustment rod 17a around a portion protruding from the outer-side surface of the other support plate portion 22d of the pair of support plate portions 22c, 22d. The nut 28a is screwed onto a male screw portion 49 at the other end portion of the adjustment rod 17a. The head 48 and the nut 28a arranged at both end portions of the adjustment rod 17a are not able to be displaced relative to each other in the axial direction of the adjustment rod 17a, so the members arranged inside in the width direction of the head portion 48 and the nut 28a in the width direction function as a displacement restricting portion that prevents displacement outward in the width direction.

In the structure of this example, the adjustment lever 23a and the cam device 24a constitute an expansion/contraction mechanism. By pivotally operating the adjustment lever 23a to expand or contract the dimension in the width direction of the cam device 24a, the space between the driven-side cam 26a and the pressing plate 30a and the space between the inner-side surfaces of the pair of support plate portions 22c, 22d may be expanded or contracted. With this expansion/contraction mechanism, the magnitude of the clamping force with which the support bracket 14a clamps the displacement bracket 13a from both sides in the width direction may be adjusted.

The adjustment lever 23a is a member that the driver pivotally operates when adjusting the position of the steering wheel 1. The adjustment lever 23a is made of a metal plate such as a steel plate, a stainless steel plate, or the like and has an elongated shape bent in a substantially crank shape. In this example, the adjustment lever 23a is arranged so as to extend rearward (toward the driver's seat) and downward going toward the tip-end side. The adjustment lever 23a includes a flat plate-shaped base portion 51 at the front end side portion (upper end side portion) thereof. The base portion 51 includes a substantially rectangular installation hole 52 penetrating in the plate thickness direction. The base portion 51 includes a circular spring locking hole 53 at a portion located in front of the installation hole 52. The adjustment lever 23a is fixed to the driving-side cam 25a by using the installation hole 52 so as not to be able to rotate relative to the driving-side cam 25a. Therefore, the driving-side cam 25a is able to rotate relative to the driven-side cam 26a by pivotally operating the adjustment lever 23a. In this example, in the state illustrated in (a) of FIG. 15A in which the adjustment lever 23a is pivotally operated upward, the cam device 24a is in the locked state, and in the state illustrated in (a) of FIG. 15B in which the adjustment lever 23a is pivotally operated downward, the cam device 24a is in the unlocked state The cam device 24a is composed of a combination of a driving-side cam 25a and a driven-side cam 26a. The driving-side cam 25a is arranged outside in the width direction, and the driven-side cam 26a is arranged inside in the width direction.

The driving-side cam 25a is made of sintered metal, has an annular plate shape as a whole, and is provided with a center hole 54 for inserting the adjustment rod 17a through. As illustrated in FIG. 12A, the driving-side cam 25a includes a driving-side cam surface 55 on the inner-side surface thereof, which is an uneven surface in the circumferential direction. As illustrated in FIG. 12B, the driving-side cam 25a includes a substantially rectangular shaped fitting convex portion 56 on the outer-side surface thereof for fitting and fixing the base portion 51 of the adjustment lever 23a.

The driving-side cam surface 55 has a flat surface shaped driving side base bottom surface 57, and has a plurality of driving-side convex portions 58 having a substantially trapezoidal cross-sectional shape that protrude inward in the width direction from a plurality (four in the illustrated example) of equally spaced locations in the circumferential direction of the driving-side base bottom surface 57. Of both side surfaces in the circumferential direction of the driving-side convex portion 58, a driving-side stopper surface 59 is provided on the front side in the unlock direction, which is the rotation direction of the driving-side cam 25a when switching to the unlocked state, and a driving-side inclined guiding surface 60 is provided on the rear side. The driving-side inclined guiding surface 60 and the driving-side stopper surface 59 incline in opposite directions in the circumferential direction, and the size of the inclination angle with respect to the driving-side base bottom surface 57 is larger for the driving-side stopper surface 59 than the driving-side inclined guiding surface 60. In this example, the driving-side stopper surface 59 is practically not used.

By fitting the installation hole 52 of the base portion 51 of the adjustment lever 23a onto the fitting convex portion 56 of the driving-side cam 25a in a non-circular shape, the driving-side cam 25a is fixed to the base portion 51 of the adjustment lever 23a, and becomes possible to reciprocally rotate as the adjustment lever 23a pivotally reciprocates. By engaging the adjustment lever 23a and the adjustment rod 17a by a concave-convex fitting or the like (not illustrated) so as not to be able to rotate relative to each other, the driving-side cam 25a is able to rotate in synchronization with the adjusting rod 17a. However, it is also possible to adopt a configuration in which the driving-side cam is externally fitted onto the adjustment rod so as to be capable of relative rotation.

As in the case of the driving-side cam 25a, the driven-side cam 26a is made of a sintered metal, has an annular plate shape as a whole, and is provided with a center hole 61 for inserting the adjustment rod 17a through. As illustrated in FIG. 12C, a driven-side cam surface 62, which is an uneven surface in the circumferential direction, is provided on the outer-side surface of the driven-side cam 26a. As illustrated in FIG. 12D, a substantially rectangular plate shaped engaging convex portion 27a that protrudes inward in the width direction is provided on the inner-side surface of the driven-side cam 26a.

The driven-side cam surface 62 has a flat surface shaped driven-side base bottom surface 63, and the same number of driven-side convex portions 64 as the number of driving-side convex portions 58 and has a substantially trapezoidal cross section that protrudes outward in the width direction from a plurality of equally spaced locations in the circumferential direction of the driven-side base bottom surface 63. Of both side surfaces in the circumferential direction of the driven-side convex portion 64, a driven-side inclined guiding surface 65 is provided on the front side in the unlocking direction, and a driven-side stopper surface 66 is provided on the rear side. The driven-side inclined guiding surface 65 and the driven-side stopper surface 66 are inclined in opposite directions in the circumferential direction, and the size of the inclination angle with respect to the driven-side base bottom surface 63 is larger for the driven-side stopper surface 66 than the driven-side inclined guiding surface 65. In this example, the driven-side stopper surface 66 is practically not used.

The driven-side cam 26a is externally fitted onto the adjustment rod 17a so as to be capable of relative rotation with respect to the adjustment rod 17a and relative displacement in the axial direction of the adjustment rod 17a. The engaging convex portion 27a engages in the long hole in the up-down direction 15c of the one support plate portion 22c so displacement is possible only along the long hole in the up-down direction 15c. Therefore, the driven-side cam 26a may be moved up and down along the long hole in the up-down direction 15c; however, except for a slight rotation due to a gap existing between the edges in the front-rear direction of the long hole in the up-down direction 15c and the side surfaces in the front-rear direction of the engaging convex portion 27a, there is no large rotation.

When the position of the steering wheel 1 is adjusted, the adjustment lever 23a is pivotally operated downward from the locked position illustrated in (a) of FIG. 15A to the unlocked position illustrated in (a) of FIG. 15B. As a result, as illustrated in (b) of FIG. 15A, the driving-side cam 25a is rotated in the unlocking direction, and as illustrated in (b) of FIG. 15B, the driving-side convex portions 58 and the driven-side convex portions 64 are alternately arranged in the circumferential direction and are in an unlocked state. The dimension in the width direction of the cam device 24a is reduced, and the space between the driven-side cam 26a and the pressing plate 30a is increased. As a result, the surface pressure at the contact portions between the inner-side surfaces of the support plate portions 22c, 22d and the outer-side surfaces of the clamped plate portions 21c, 21d is reduced or lost, and at the same time, the inner diameter of the column fitting portion 37 of the outer column 18a is elastically increased, and the surface pressure at the contact portion between the inner peripheral surface of the column fitting portion 37 and the outer peripheral surface on the rear portion of the inner column 19a is reduced. In this unclamped state, the vertical position and front-rear position of the steering wheel 1 may be adjusted within a range in which the adjustment rod 17a is able to move inside the pair of long holes in the up-down direction 15c, 15d and the pair of long holes in the front-rear direction 16c, 16d.

In order to maintain the steering wheel 1 at a desired position, after moving the steering wheel 1 to the desired position, the driving-side cam 25a is rotated in the locking direction by pivotally operating the adjustment lever 23a upward from the state illustrated in (a) of FIG. 15B. As illustrated in (b) of FIG. 15A, the tip-end surfaces of the driving-side convex portions 58 and the tip-end surfaces of the driven-side convex portions 64 come in contact with each other (locked state), the dimension in the width direction of the cam device 24a is increased, and the space between the driven-side cam 26a and the pressing plate 30a (the space between the inner-side surfaces of the pair of support plate portions 22c, 22d) is reduced. As a result, the surface pressure of the contact portion between the inner-side surfaces of the support plate portions 22c, 22d and the outer-side surfaces of the clamped plate portions 21c, 21d increases, while at the same time, the inner diameter of the column fitting portion 37 is elastically reduced, and the surface pressure of the contact portion between the inner peripheral surface of the column fitting portion 37 and the outer peripheral surface of the rear portion of the inner column 19a increases. In this clamped state, the steering wheel 1 is maintained at the adjusted position.

The disc spring 50 is made of metal such as carbon steel, carbon tool steel, spring steel, or the like, has a circular ring shape, and is externally fitted to a portion near one end of the adjustment rod 17a, and sandwiched between the inner-side surface of the head portion 48 of the adjustment rod 17a and the outer-side surface of the base portion 51 of the adjustment lever 23a. The disc spring 50 applies an elastic force to the inner-side surface of the head portion 48 and to the outer-side surface of the base portion 51 in directions away from each other. Therefore, in order to adjust the position of the steering wheel 1, even when the clamping force is released, it is possible to suppress looseness in the width direction of the cam device 24a between the inner-side surface of the head portion 48 and the outer-side surface of the one support plate portion 22c, and it is possible to suppress looseness in the width direction in the thrust bearing 29a and the pressing plate 30a between the inner-side surface of the nut 28a and the outer-side surface of the other support plate portion 22d. In this example, it is possible to suppress looseness in the width direction in the cam device 24a and the thrust bearing 29a by using the moment acting on the pressing plate 30a, so the disc spring 50 may be omitted.

Figure 13:
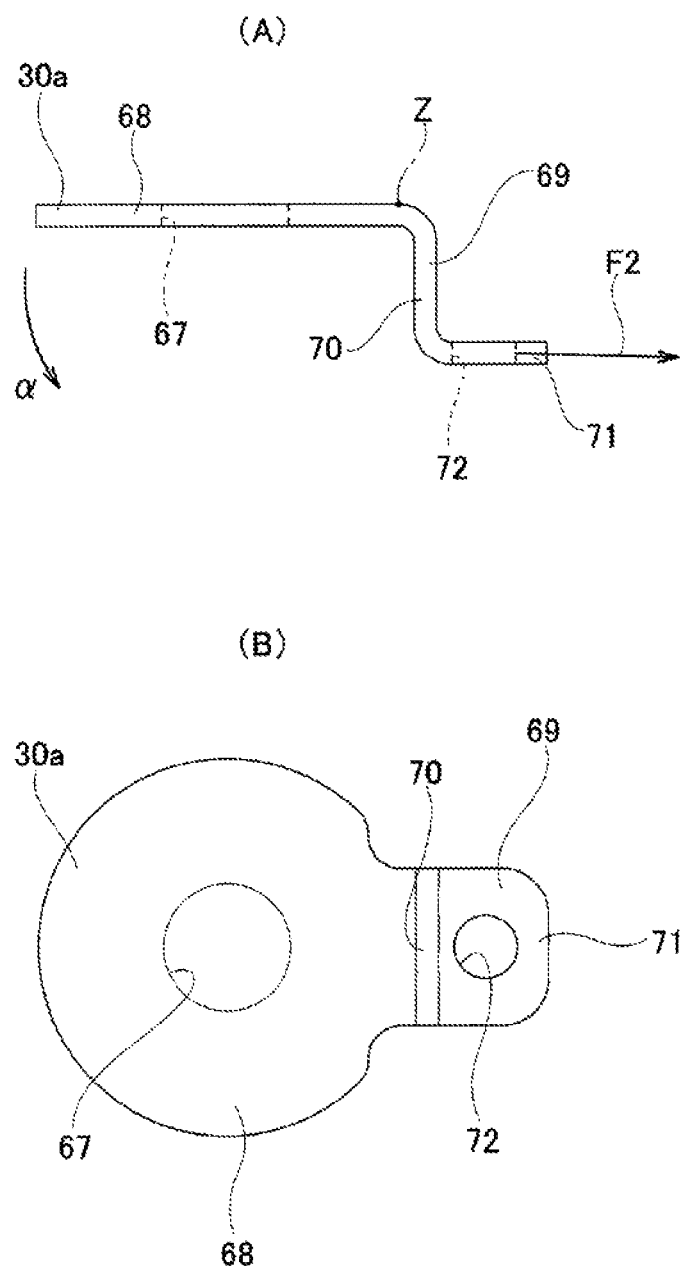
FIGS. 13A and 13B illustrate a pressing plate assembled in the steering device of the first example, where

As illustrated in FIG. 13, the pressing plate 30a is made of a metal plate such as a cold rolled steel plate (SPCC), a hot rolled steel plate (SPHC), or the like and has a crank shape as a whole. The pressing plate 30a is externally fitted to a portion near the other end of the adjustment rod 17a so that relative rotation with respect to the adjustment rod 17a and relative displacement in the axial direction of the adjustment rod 17a are possible. The pressing plate 30a has an insertion hole 67 through which the adjustment rod 17a is inserted, and includes a circular ring-shaped plate main body 68 that is externally fitted to the adjustment rod 17a, and a substantially L-shaped locking plate portion 69 arranged at one location in the circumferential direction of the outer peripheral edge of the plate main body 68. The base half portion 70 of the locking plate portion 69 has a flat plate shape and extends outward in the width direction from the outer peripheral edge of the plate main body 68 (axial direction of the plate main body 68), and the front half portion 71 of the locking plate portion 69 has a flat plate shape and extends from the outer end portion (tip-end portion) in the width direction of the base half portion 70 toward the side opposite to the plate main body 68 so as to be bent at a substantially right angle. The plate main body 68 is arranged between the outer-side surface of the other support plate portion 22d and the inner-side surface of the thrust bearing 29a. The front half portion 71 of the locking plate portion 69 includes a circular spring locking hole 72. In this example, the distance from the rotation center (center axis) of the adjustment rod 17a to the spring locking hole 72 is the same as the distance from the rotation center of the adjustment rod 17a to the spring locking hole 53 provided in the base portion 51 of the adjustment lever 23a. The plate main body 68 and the front half portion 71 of the locking plate portion 69 are arranged parallel to each other, and the base half portion 70 of the locking plate portion 69 is arranged at a right angle to the plate main body 68 and the front half portion 71 of the locking plate portion 69. In this example, the pressing plate 30a corresponds to the locked portion.

The thrust bearing 29a has a pair of circular plate-shaped bearing rings and a plurality of needles radially arranged between the pair of bearing rings. The thrust bearing 29a bears the thrust load acting on the pressing plate 30a from the nut 28a, and enables the nut 28a to reciprocally pivot.

Figure 1:
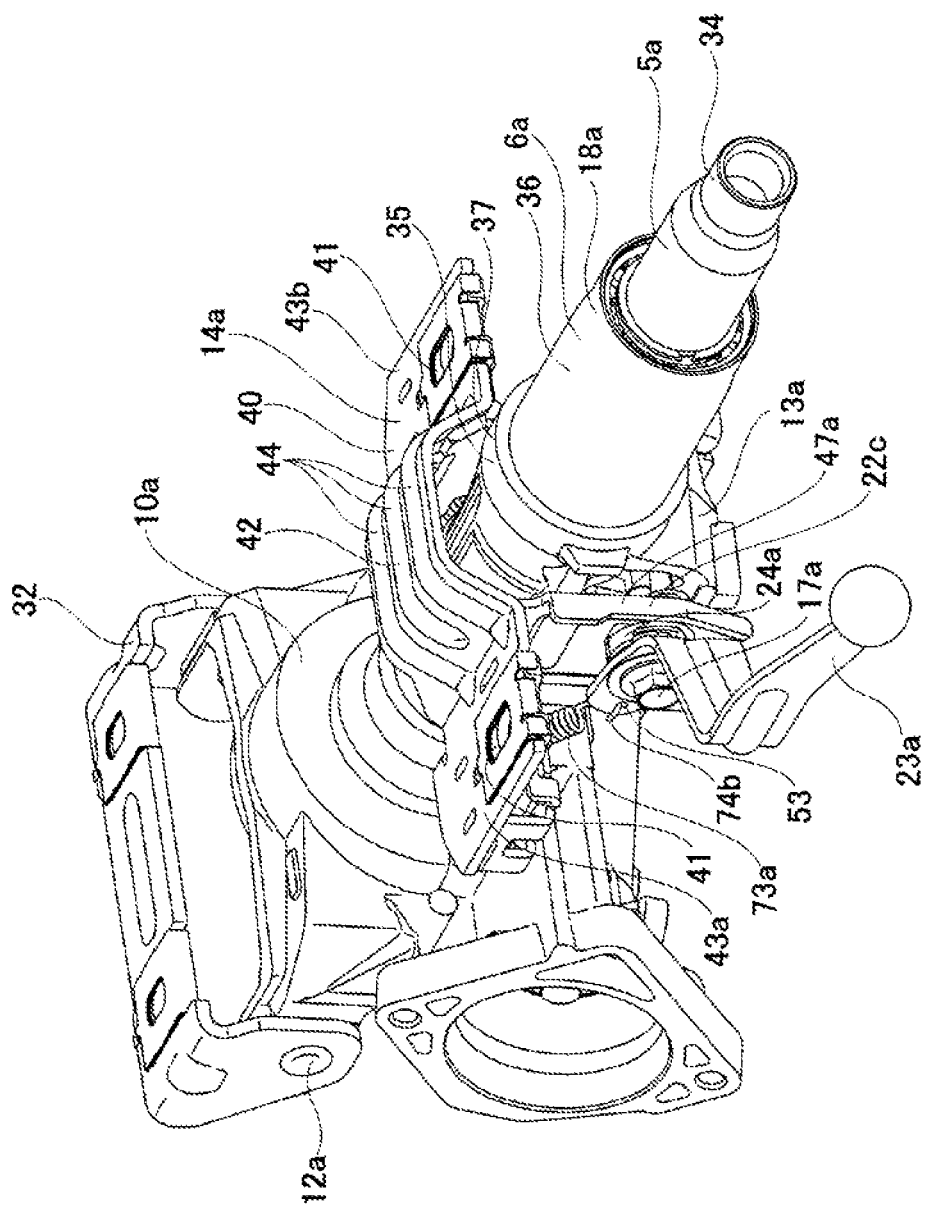
FIG. 1 is a perspective view of a steering device of a first example of an embodiment of the present invention as viewed from the rear side and the upper side on the adjustment lever side.
Figure 2:
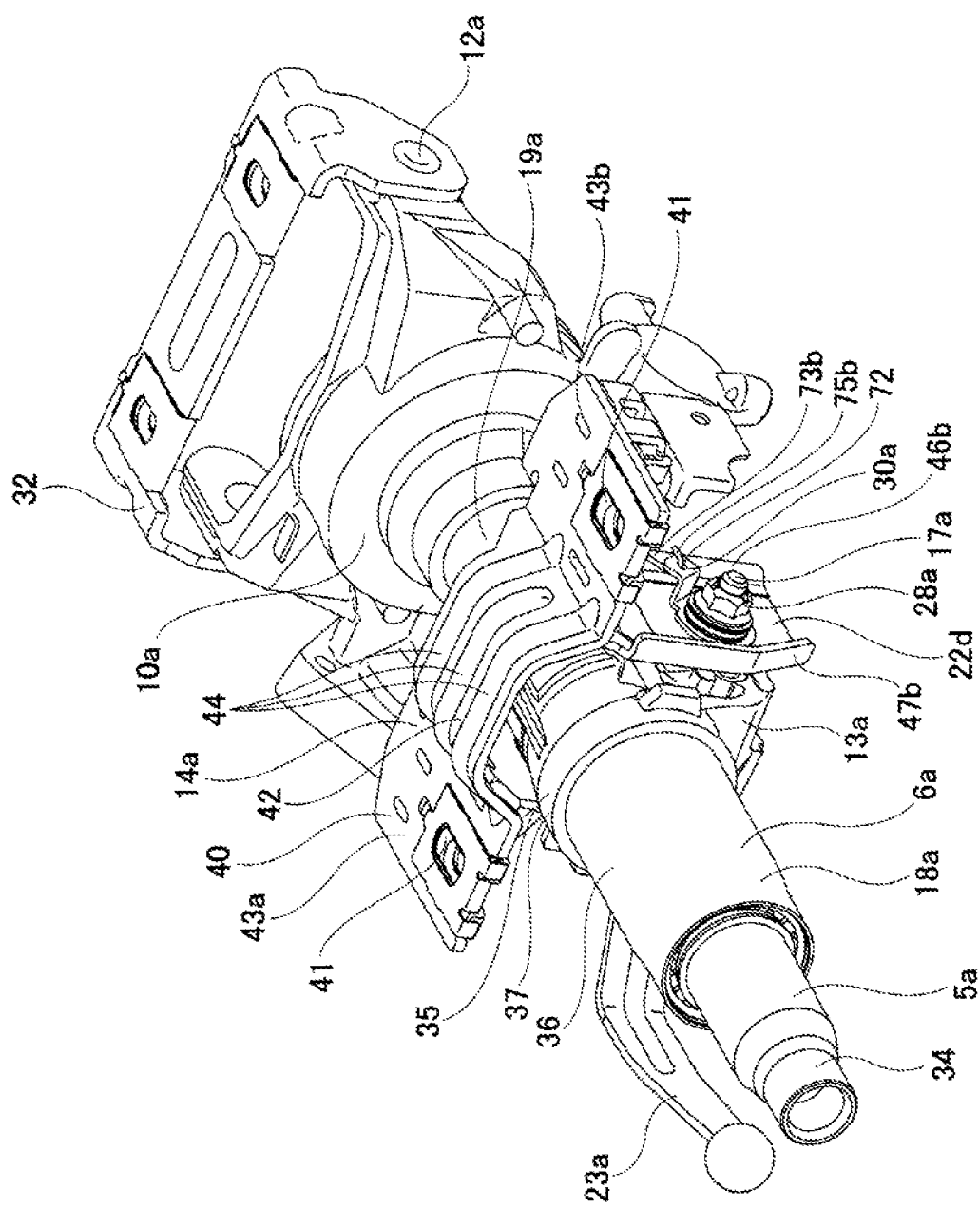
FIG. 2 is a perspective view of the steering device of the first example as viewed from the rear side and the upper side on the side opposite to the adjustment lever.
Figure 3:
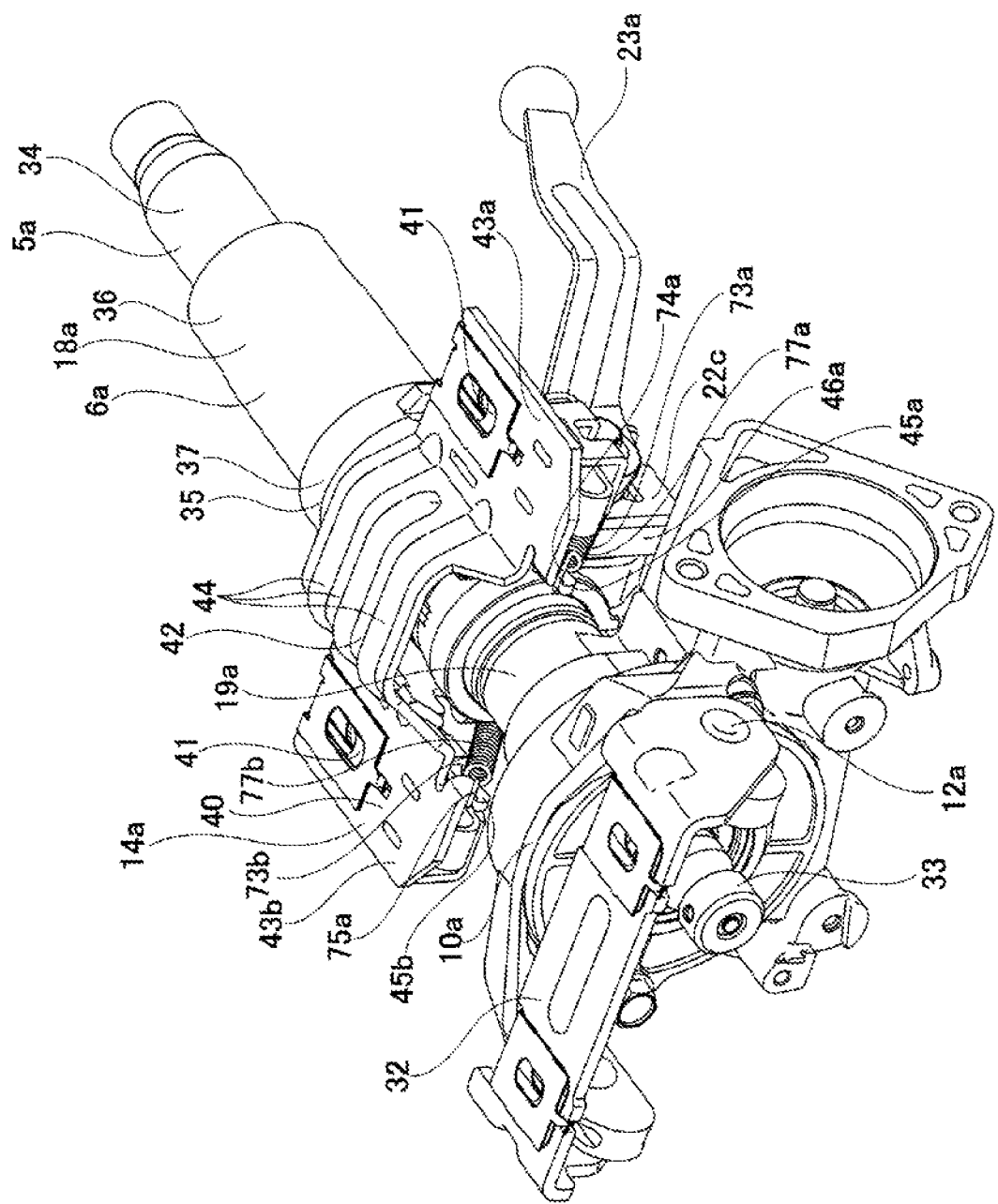
FIG. 3 is a perspective view of the steering device of the first example as viewed from the front side and the upper side on the adjustment lever side.
Figure 4:
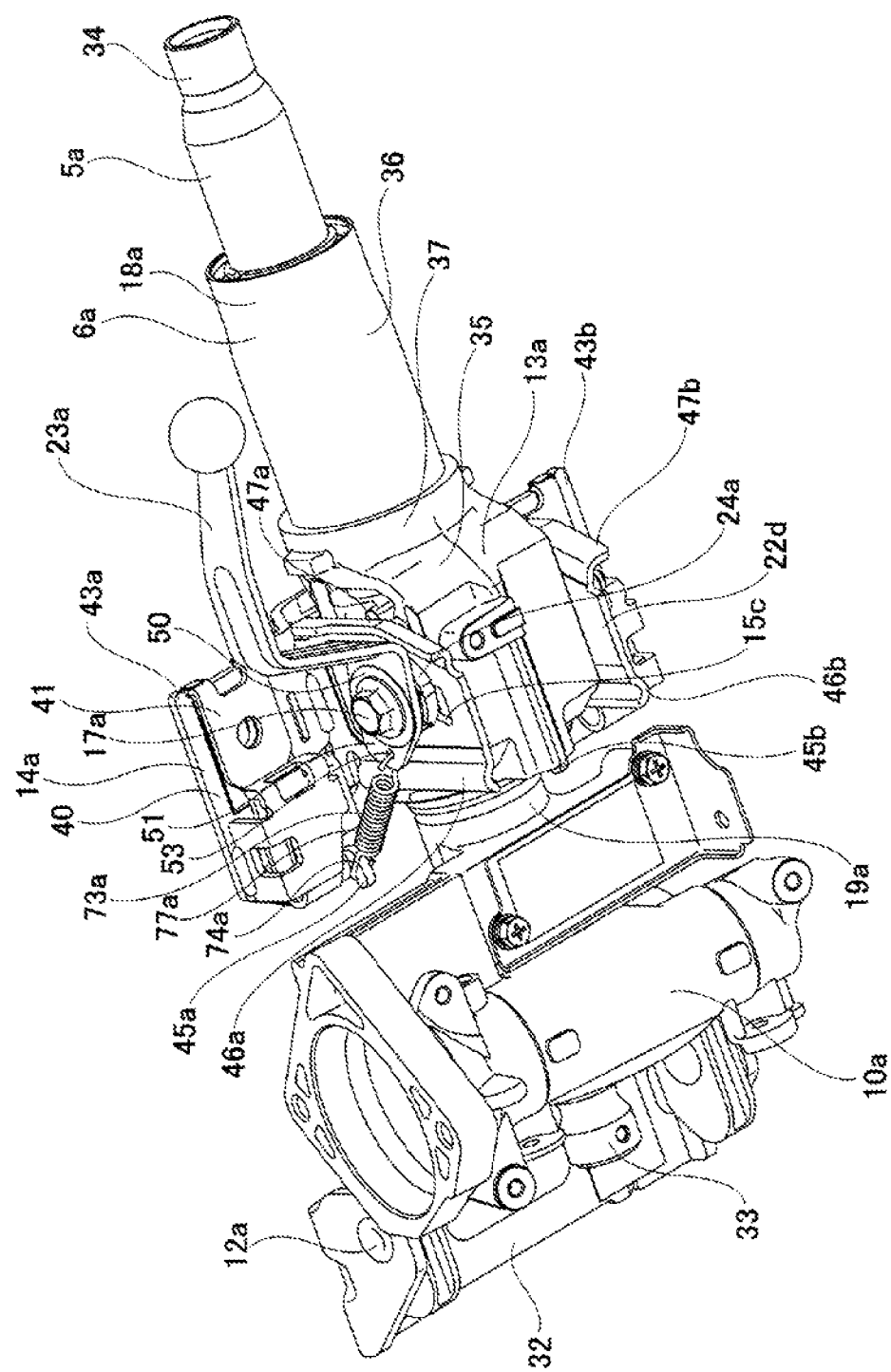
FIG. 4 is a perspective view of the steering device of the first example as viewed from the rear side and the lower side on the adjustment lever side.
Figure 5:
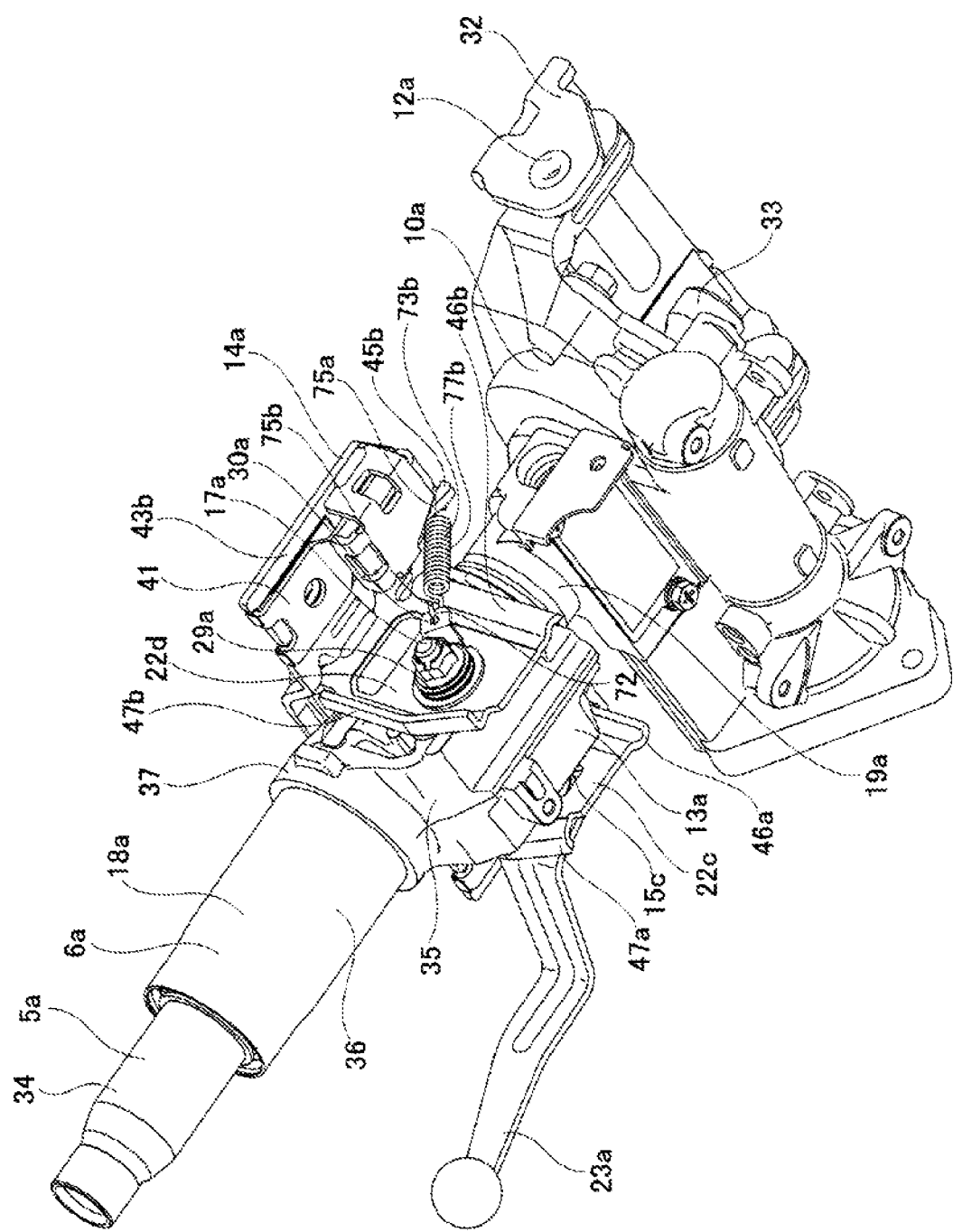
FIG. 5 is a perspective view of the steering device of the first example as viewed from the rear side and the lower side on the side opposite to the adjustment lever.
Figure 6:
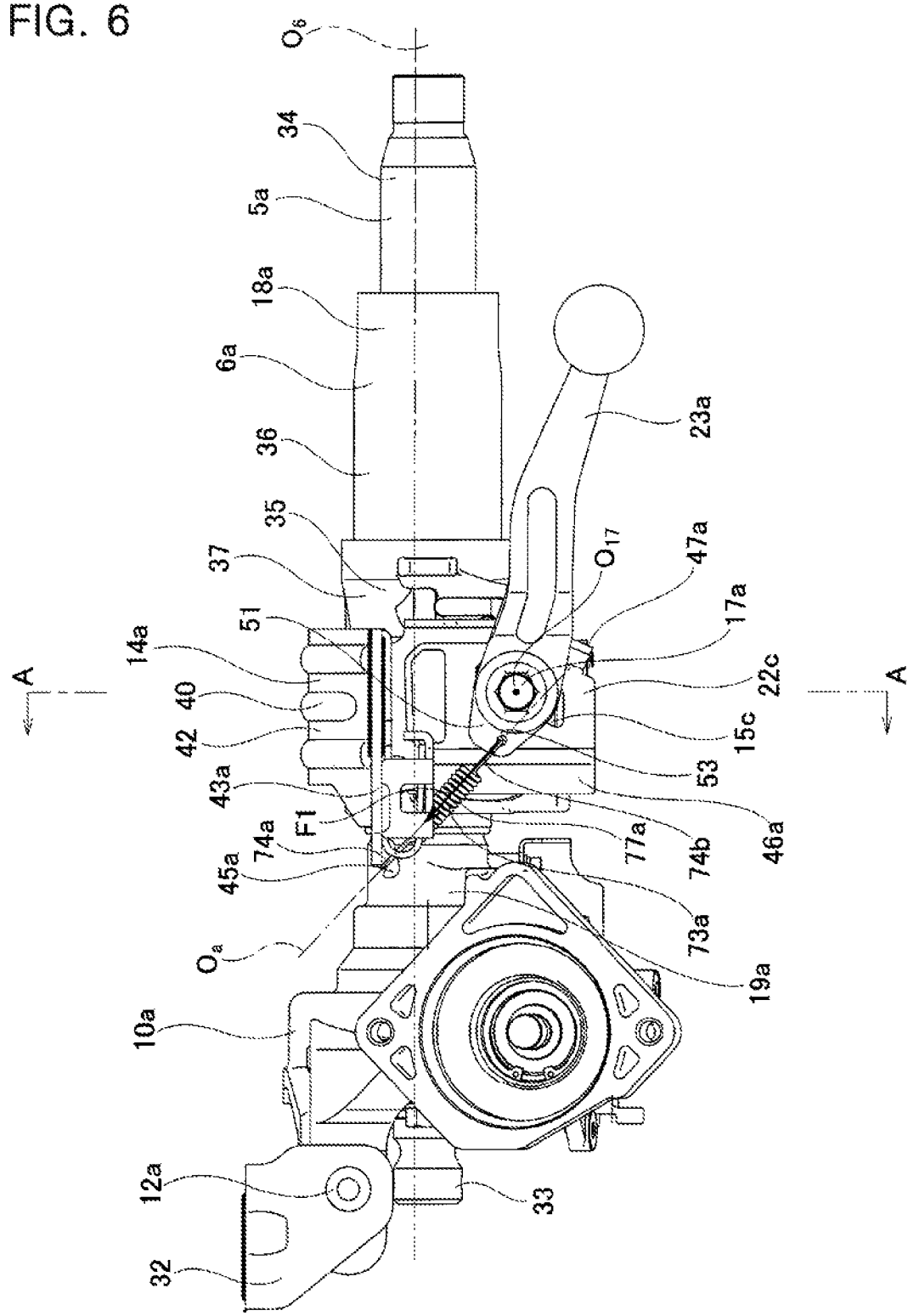
FIG. 6 is a side view of the steering device of the first example as seen from the adjustment lever side.
Figure 7:
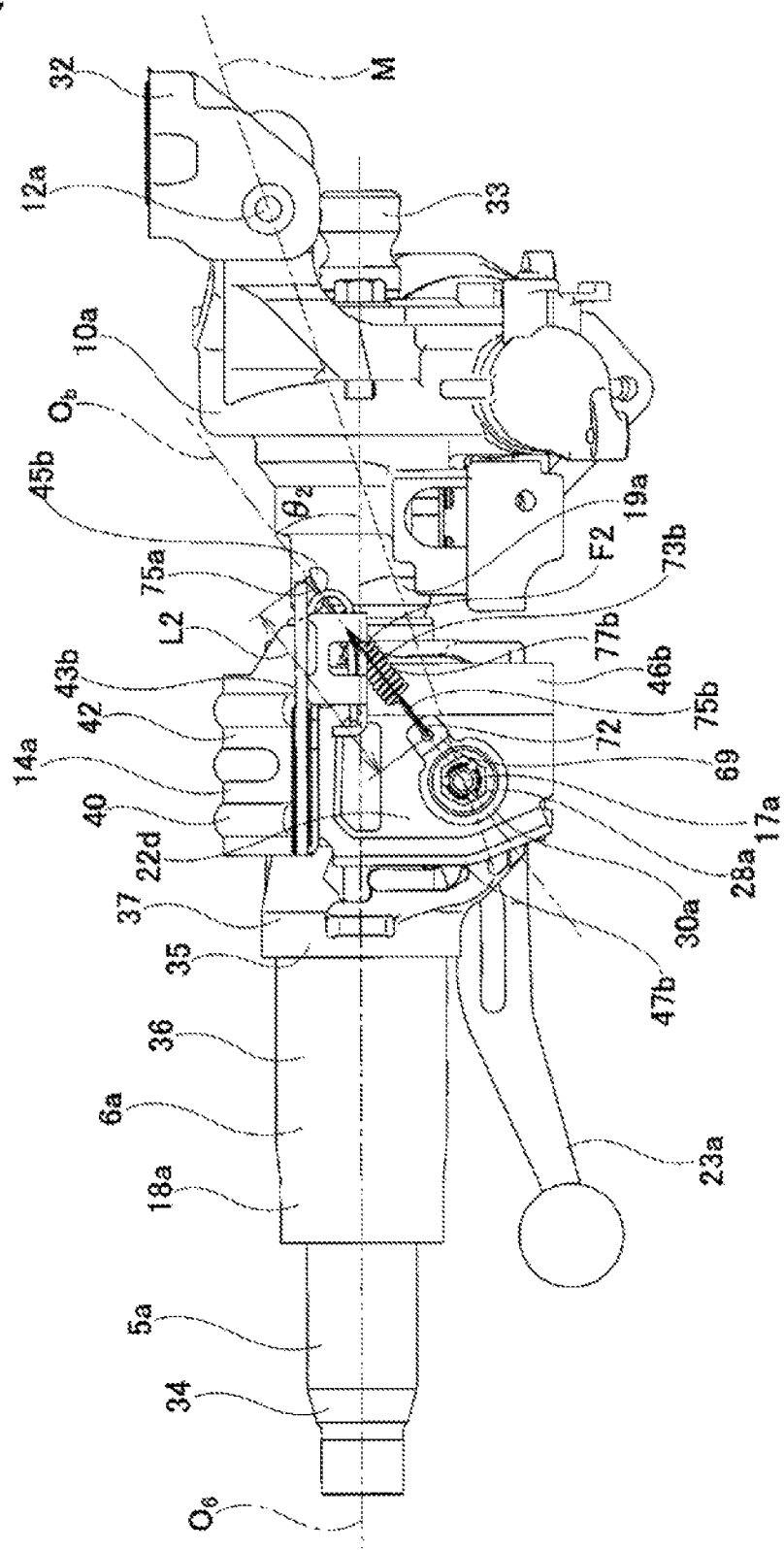
FIG. 7 is a side view of the steering device of the first example as seen from the side opposite to the adjustment lever.
Figure 8:
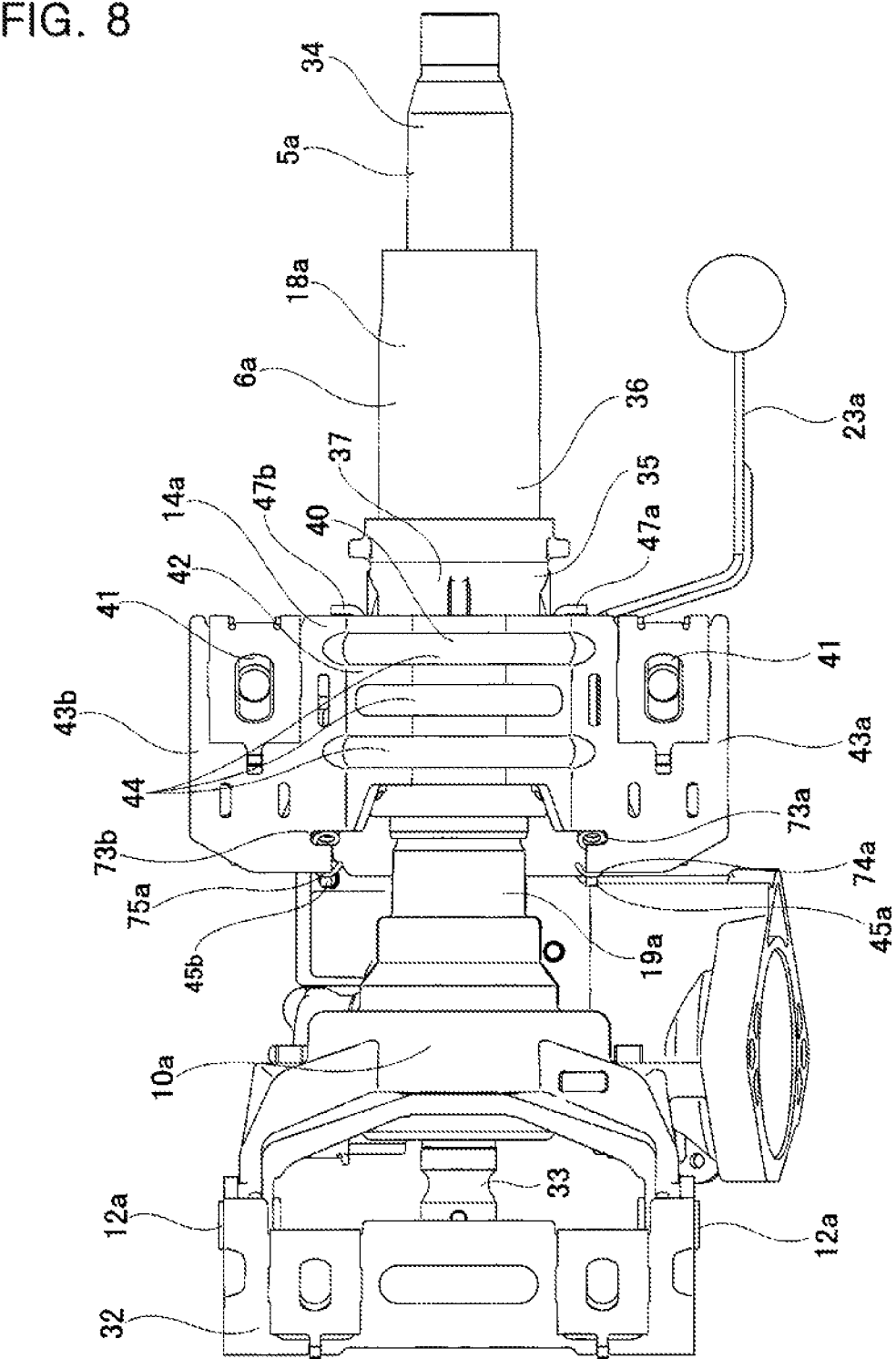
FIG. 8 is a top view of the steering device of the first example.
Figure 9:
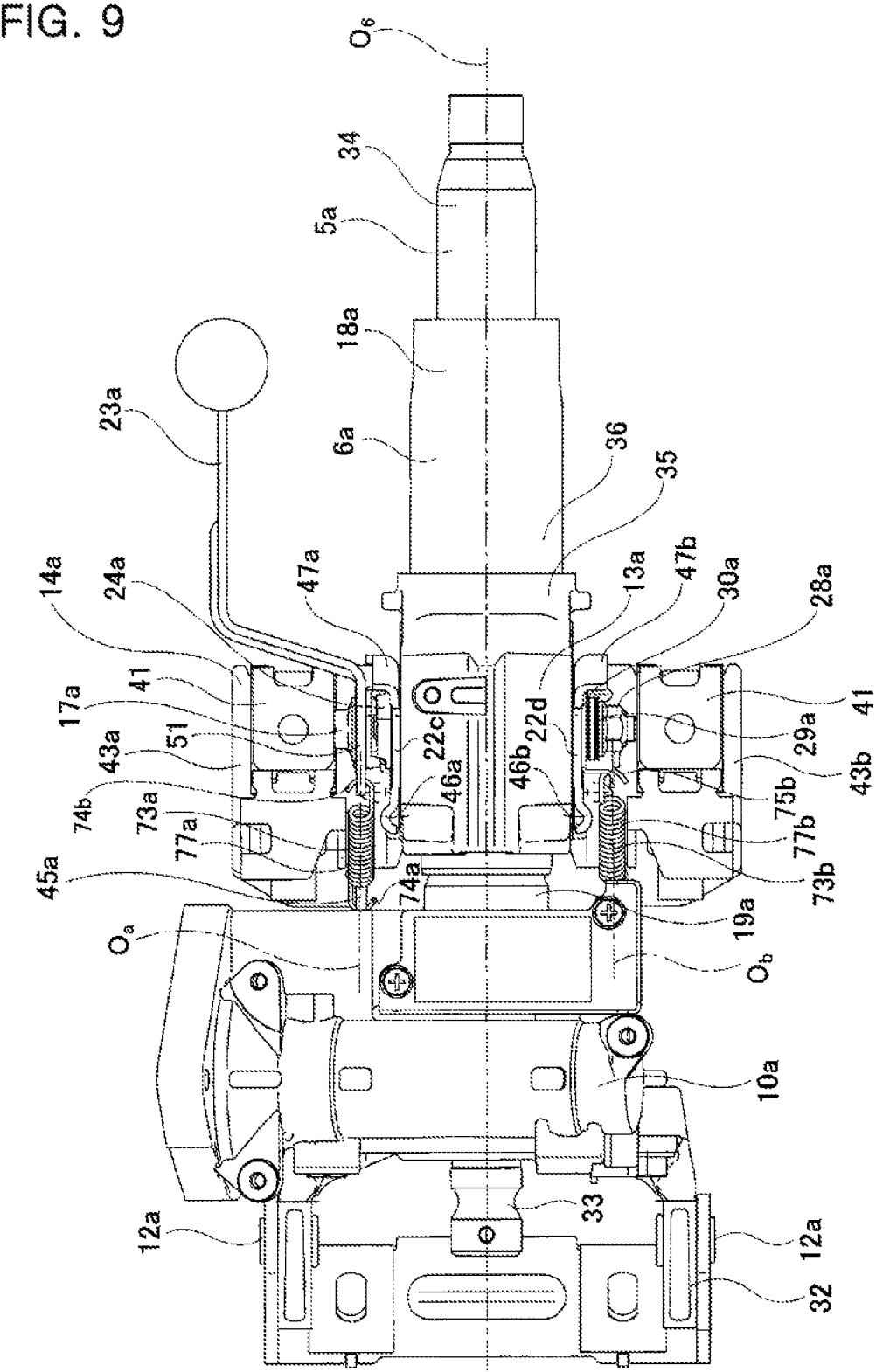
FIG. 9 is a bottom view of the steering device of the first example.

In this example, in order to adjust the position of the steering wheel 1, the dimension in the width direction of the cam device 24a is reduced, and in order to prevent the steering column 6a from tilting so that the steering wheel 1 drops when the clamping force is released, a pair of tension springs 73a, 73b is arranged on both outer sides in the width direction of the pair of support plate portions 22c, 22d of the support bracket 14a. In this example, the pair of tension springs 73a, 73b is configured by identical coil springs made of spring steel such as stainless steel, piano wire, or the like having the same spring constant, and having the same length dimension in the free state. As illustrated in FIG. 9, the center axes $O_a$, $O_b$ of the pair of tension springs 73a, 73b are arranged so as to be inclined at a slight angle (for example 1 to 5 degrees) with respect to the center axis $O_6$ of the steering column 6a in a direction outward in the width direction while going toward the front (directions going away from each other, or are arranged in parallel. As illustrated in FIGS. 6 and 7, the center axes $O_a$, $O_b$ of the pair of tension springs 73a, 73b are inclined by about several tens of degrees (for example, 30 to 50 degrees) upward while going toward the front. In this example, the inclination angle of the steering column 6a in the width direction with respect to the center axis $O_6$ is substantially the same for the one tension spring 73a and the other tension spring 73b.

The one tension spring 73a of the pair of tension springs 73a, 73b has a U-shaped hook portion 74a arranged at one end portion, a U-shaped hook portion 74b arranged at the other end portion, and a coil portion 77a arranged in the intermediate portion. The hook portion 74a is locked to the locking arm portion 45a of the one side plate portion 43a from the outer side in the width direction. The hook portion 74b is locked in the spring locking hole 53 of the base portion 51 of the adjustment lever 23a from the inner side in the width direction. Accordingly, the one tension spring 73a is arranged so as to span between the one side plate portion 43a and the base portion 51 of the adjustment lever 23a. The one tension spring 73a applies a force F1 directed diagonally upward and toward the front to the base portion 51 of the adjustment lever 23a, and as illustrated in FIG. 14, the front side surface of the engaging convex portion 27a of the driven-side cam 26a is elastically pressed against the front side edge of the long hole in the up-down direction 15c of the one support plate portion 22c.

The other tension spring 73b of the pair of tension springs 73a, 73b has a U-shaped hook portion 75a arranged at one end portion, a U-shaped hook portion 75b arranged at the other end portion, and a coil portion 77b arranged in the intermediate portion. The hook portion 75a is locked to the locking arm portion 45b of the other side plate portion 43b from the outside in the width direction. The hook portion 75b is locked in the spring locking hole 72 of the front half portion 71 of the locking plate portion 69 of the pressing plate 30a from the inside in the width direction. Accordingly, the other tension spring 73b is arranged so as to span between the other side plate portion 43b and the pressing plate 30a. The other tension spring 73b applies a force F2 directed diagonally upward and toward the front to the pressing plate 30a.

In the steering device of this example, the pair of tension springs 73a, 73b arranged on both outer sides in the width direction of the support bracket 14a applies a force directed diagonally upward and toward the front to both ends of the adjustment rod 17a. Therefore, an upward force is applied to the outer column 18a, tilting of the steering column 6a when adjusting the position of the steering wheel 1 (when unclamped) may be prevented, and it is possible to adjust the vertical position of the steering wheel 1 with a light force.

Next, the force applied from the one tension spring 73a to the base portion 51 of the adjustment lever 23a and the force applied from the other tension spring 73b to the pressing plate 30a will be described in detail.

The position of the spring locking hole 53 of the base portion 51 of the adjustment lever 23a moves in an arc shape around the center axis $O_{17}$ of the adjustment rod 17a due to the pivotal operation of the adjustment lever 23a, so the distance from the spring locking hole 53 to the locking arm portion 45a changes. Therefore, in the case of the one tension spring 73a spanning between the locking arm portion 45a and the spring locking hole 53 as well, the tilt angle of the steering column 6a with respect to the central axis $O_6$ and entire length thereof change due to the pivotal operation of the adjustment lever 23a. In this example, in a state in which the adjustment lever 23a is pivotally operated in a direction to reduce the dimension in the width direction of the cam device 24a and the adjustment lever 23a is moved to the unlocked position, or in other words, in a state in which the adjustment lever 23a is rotated downward, the dimensions of related members and the assembling phase and the like of the adjustment lever 23a and the driving-side cam 25a are regulated so that the inclination angle θ1 of the tension spring 73a with respect to the center axis $O_6$ of the steering column 6a and the total length L1 of the one tension spring 73a illustrated in FIG. 15B, and the inclination angle θ2 of the other tension spring 73b with respect to the center axis $O_6$ of the steering column 6a and the total length L2 of the other tension spring 73b illustrated in FIG. 7 are the same as each other (θ1=θ2, L1=L2) or practically the same (θ1≈θ2, L1≈L2).

The pressing plate 30a is pressed against the outer-side surface of the other support plate portion 22c and the inner-side surface of the thrust bearing 29a based on the pulling force of the other tension spring 73a, so even when the adjustment rod 17a is moved in the up-down direction, the rotational phase thereof hardly changes. Therefore, regardless of the vertical position of the adjustment rod 17a, when the adjustment lever 23a is moved to the unlocked position, the inclination angle of the one tension spring 73a and the other tension spring 73b with respect to the steering column 6a and the total length thereof are the same as each other. In this example, regardless of the vertical position of the adjusting rod 17a, in a state in which the adjustment lever 23a is moved to the unlocked position, the acting direction of the forces of the pair of tension springs 73a, 73b is directed further upward at a specified angle (for example, about 10 to 30 degrees) more than the direction of an imaginary straight line (see FIG. 7) that is orthogonal to the tilt shaft 12a and the adjustment rod 17a. In other words, the angle formed by the center axis $O_6$ of the steering column 6a and the acting direction of the forces of the tension springs 73a, 73b is larger than the angle formed by the center axis $O_6$ of the steering column 6a and the imaginary straight line M. In a case of implementing the present invention, in a state in which the adjustment lever is pivotally operated to the unlocked position, as long as the pair of tension springs apply a force of the same magnitude to the base portion of the adjustment lever and the locked portion in an action direction that is diagonally upward and toward the front with respect to the center axis of the steering column, the configuration of the tension springs is not limited to the preferred example described above, and it is also possible to adopt a configuration in which the structure, shape, and length (installation positions of both ends) are different between one tension spring and the other tension spring.

The force applied from the one tension spring 73a to the base portion 51 of the adjustment lever 23a acts as a resistance force (brake) that suppresses the rotation of the driving-side cam 25a.

When the adjustment lever 23a is pivotally operated downward from the clamped position illustrated in (a) of FIG. 15A in order to adjust the position of the steering wheel 1, the driving-side inclined guiding surface 60 of the driving-side convex portion 58 of the driving-side cam surface 55 is guided by the driven-side inclined guiding surface 65 of the driven-side convex portion 64 of the driven-side cam surface 62. At this time, not only an inertial force acts, but also the elastic restoring force of the pair of clamped plate portions 21c, 21d and the own weight of the adjustment lever 23a act on the driving-side cam 25a, so the driving-side cam 25a is in a state of being biased in the direction of rotation, and the driving-side cam 25a tends to rotate with much energy. When the adjustment lever 23a is pivotally operated downward and the spring locking hole 53 moves upward, at a specified position, the hook portion 74a on one end side and the hook portion 74b on the other end side of the one tension spring 73a, and the center axis $O_{17}$ of the adjustment rod 17a are aligned on the same straight line, and the tension spring 73a is in the most contracted state. In order to pivotally operate the adjustment lever 23a further downward from the specified position (to further rotate the driving-side cam 25a), it is necessary to extend the one tension spring 73a, so the spring force of the one tension spring 73a acts as a resistance force. In other words, a force is applied from the one tension spring 73a to the base portion 51 of the adjustment lever 23a resisting the downward pivotal operation of the adjustment lever 23a.

In this example, the installation position of the one tension spring 73a, the assembled phase of the adjustment lever 23a and the driving-side cam 25a, or the like is restricted so that before the adjustment lever 23a moves to the lower pivotal operation limit (lower end of the pivotal operation), the hook portion 74a on one end side and the hook portion 74b on the other end side of the one tension spring 73a, and the center axis $O_{17}$ of the adjustment rod 17a are aligned on the same straight line. Accordingly, in this example, by utilizing the force of the one tension spring 73a, as illustrated in (b) of FIG. 15B, the downward pivotal operation of the adjustment lever 23a automatically stops during a stage where the driving-side inclined guiding surface 60 is being guided by the driven-side inclined guiding surface 65, or in other words, before the adjustment lever 23a moves to the lower end of pivotal operation regardless of a biasing force in the direction of rotation such as described above when pivotally operating the adjustment lever 23a downward from the clamped position. Therefore, by the driving-side cam surface 55 and the driven-side cam surface 62 coming in contact over the entire surface, the downward pivotal operation of the adjustment lever 23a is stopped before the dimension in the width direction of the cam device 24a becomes the smallest. Therefore, in a state in which the adjustment lever 23a is moved to the unclamped position, the driving-side cam surface 55 and the driven-side cam surface 62 are in partial contact with each other. More specifically, only the driving-side inclined guiding surface 60 and the driven-side inclined guiding surface 65 are in contact with each other, and a gap 76a is formed between the tip end surface of the driving-side convex portion 58 and the driven-side base bottom surface 63, a gap 76b is formed between the tip end surface of the driven-side convex portion 64 and the driving-side base bottom surface 57, and a gap 76c is formed between the driving-side stopper surface 59 and the driven-side stopper surface 66.

With the steering device of this example, it is possible to prevent the generation of abnormal noise (metal contact noise) due to a forceful impact between the tip end surface of the driving-side convex portion 58 and the driven-side base bottom surface 63, the tip end surface of the driven-side convex portion 64 and the driving-side base bottom surface 57, and the driving-side stopper surface 59 and the driven-side stopper surface 66 when the pivotally operating the adjustment lever 23a downward from the clamped position. Furthermore, as illustrated in (b) of FIG. 15B, the dimension in the width direction of the cam device 24a in the unlocked state may be increased by the amount of the gap 76a between the tip end surface of the driving-side convex portion 58 and the driven-side base bottom surface 63, and the gap 76b between the tip end surface of the driven-side convex portion 64 and the driving-side base bottom surface 57. Therefore, it is possible to suppress looseness in the width direction of the cam device 24a between the inner-side surface of the head portion 48 and the outer-side surface of the one support plate portion 22c, and it is possible to suppress looseness in the width direction of the thrust bearing 29a and the pressing plate 30a between the inner-side surface of the nut 28a and the outer-side surface of the other support plate portion 22d. Furthermore, the rotation of the driving-side cam 25a may be braked by the one tension spring 73a, so the adjustment lever 23a is prevented from pivoting vigorously and a part of the adjustment lever 23a is prevented from colliding with the passenger's fingers or the like.

The force applied from the other tension spring 73b to the pressing plate 30a causes a moment to act on the pressing plate 30a.

In the present example, the hook portion 75b of the other tension spring 73b is locked to the front half portion 71 of the locking plate portion 69 arranged at a position separated (offset) in the width direction with respect to the plate main body 68 externally fitted onto the adjustment rod 17a. Therefore, as illustrated in FIG. 13, due to the force F2 acting from the other tension spring 73b, a moment in the direction of arrow α, and with the bent portion between the plate main body 68 and the base half portion 70 of the locking plate portion 69 as a fulcrum, acts around an imaginary straight line Z extending in the extension direction of the bent portion on the pressing plate 30a. Therefore, the plate main body 68 applies a force to the outer-side surface of the other support plate portion 22d and the inner-side surface of the thrust bearing 29a in directions away from each other. Therefore, as in the case of the disc spring 50, even when the clamping force is released, it is possible to suppress looseness in the width direction of the cam device 24a between the inner-side surface of the head portion 48, which is a displacement restricting portion, and the outer-side surface of the one support plate portion 22c, and it is possible to suppress looseness in the width direction of the thrust bearing 29a between the inner-side surface of the nut 28a, which is a displacement restricting portion, and the outer-side surface of the plate main body 68.

With the steering device of this example, not only is it possible to reduce the force required for adjusting the vertical position of the steering wheel 1, but it is also possible to ensure smoothness of the work for adjusting the front-rear position of the steering wheel 1. In other words, a pair of tension springs 73a, 73b is arranged on both outer sides in the width direction of the pair of support plate portions 22c, 22d of the support bracket 14a, and forces directed diagonally upward and toward the front are respectively applied to the base portion 51 of the adjustment lever 23a and the pressing plate 30a that are arranged at portions on both ends of the adjustment rod 17a. Therefore, a force (component force) directed upward is applied to the outer column 18a, so it is possible to prevent the steering column 6a from tilting so that the steering wheel 1 drops, and it is possible to reduce the force required to adjust the vertical position of the steering wheel 1 even when the clamping force is released when adjusting the position of the steering wheel 1.

The acting direction of the force by the pair of tension springs 73a, 73b is not upward along the extending direction of the pair of long holes in the up-down direction 15c, 15d, but is a direction diagonally upward and toward the front, so the component force in the upward direction may be kept small.

The front side surface of the engaging convex portion 27a of the driven-side cam 26a comes in elastic contact with the front side edge of the long hole in the up-down direction 15c of the one support plate portion 22c, so when the adjustment rod 17a moves upward, a frictional force may be generated between the front side surface of the engaging convex portion 27a and the front side edge of the long hole in the up-down direction 15c. Therefore, the force of pressing the adjustment rod 17a against the upper surfaces of the inner peripheral surfaces of the long holes in the front-rear direction 16c, 16d may be reduced, and the sliding resistance between the outer peripheral surface of the adjustment rod 17a and the upper surfaces of the long holes in the front-rear direction 16c, 16d may be reduced. Therefore, it is possible to prevent the force required for adjusting the front-rear position of the steering wheel 1 from increasing, and it is possible to ensure the smoothness of the work for adjusting the front-rear position of the steering wheel 1.

In the steering device of this example, compared to a conventional structure, the upward pushing force that the adjustment rod 17a applies to the upper surfaces of the long holes in the front-rear direction 16c, 16d tends to become weak, so the action direction of the forces of the pair of tension springs 73a, 73b is set to be further upward by a predetermined angle than the direction of the virtual straight line M that is orthogonal to the center axis of the tilt shaft 12a and the center axis of the adjustment rod 17a, preventing the upward pushing force from becoming too low.

In this example, in a state in which the adjustment lever 23a is moved to the unlocked position, the pair of tension springs 73a, 73b applies forces having the same magnitude as each other and directed in the same direction to the base portion 51 of the adjustment lever 23a and the pressing plate 30a. Therefore, when adjusting the position of the steering wheel 1, the posture of the adjustment rod 17a may be stabilized, and the adjustment rod 17a may be prevented from tilting up and down.

In this example, the acting direction of the forces by the pair of tension springs 73a, 73b is not the upward direction along the extending direction of the pair of long holes in the up-down direction 15c, 15d, but is diagonally upward going toward the front, so together with being able to keep the component force in the upward direction small, it is possible to generate a frictional force between the front side surface of the engaging convex portion 27a and the front side edge of the long hole in the up-down direction 15c. Therefore, when the clamping force is released, the position of the steering wheel 1 may be maintained at the position in the state when the clamping force is released. Therefore, it is possible to realize a structure in which the steering wheel 1 does not suddenly bounce or suddenly drop when the clamping force is released, that is conventionally required for the steering device.

In this example, preferably, the center axes $O_a$, $O_b$ of the pair of tension springs 73a, 73b are inclined with respect to the center axis $O_6$ of the steering column 6a in a direction toward the outer side in the width direction (away from each other) while going toward the front. In this case, component forces directed toward the outer side in the width direction may be applied to the base portion 51 of the adjustment lever 23a and the pressing plate 30a. From this aspect as well, it is possible to prevent looseness of the cam device 24a and the thrust bearing 29a in the width direction when the clamping force is released.

One tension spring 73a pulls the base portion 51 of the adjustment lever 23a diagonally upward and toward the front, so when the clamping force is released, it is possible to prevent the one end side of the adjustment rod 17a from tilting downward due to the own weight of the adjustment lever 23a. Therefore, when adjusting the vertical position of the steering wheel 1, it is possible to prevent vertical vibration (violent motion) of the adjustment lever 23a due to the interference of the smooth displacement of the adjustment rod 17a in the long hole in the up-down direction 15c.

Therefore, it is possible to prevent the generation of abnormal noise (rattling noise) and also prevent the transmission of small vibration to the steering wheel 1.

When the adjustment lever 23a is pivotally operated downward to some extent to adjust the position of the steering wheel 1, the driving-side cam 25a tends to rotate vigorously. At this time, the driven-side cam 26a also tends to rotate about the adjustment rod 17a due to the concave and convex engagement of the driving-side cam surface 55 and the driven-side cam surface 62. However, in this example, the front side surface of the engaging convex portion 27a of the driven-side cam 26a is elastically pressed against the front side edge of the long hole in the up-down direction 15c by the elastic force of the tension spring 73a, so it is possible to effectively prevent the driven-side cam 26a from rotating. Therefore, it is possible to prevent abnormal noise (metal contact sound) from being generated due to the side surfaces in the front-rear direction of the engaging convex portion 27a vigorously colliding with the side edges in the front-rear direction of the long hole in the up-down direction 15c.

When adjusting the front-rear position of the steering wheel 1, even when the steering wheel 1 is moved to the front side as much as possible, and the adjustment rod 17a is clamped between the rear end edges of the pair of long holes in the front-rear direction 16c, 16d and the front edges of the pair of long holes in the up-down direction 15c, 15d, the front side surface of the engaging convex portion 27a is in contact with the front side edge of the long hole in the up-down direction 15c beforehand, so it is also possible to prevent the collision sound from being generated due to the front side surface of the engaging convex portion 27a vigorously colliding with the front side edge of the long hole in the up-down direction 15c.

A configuration may also be employed in which an extension arm portion extending from the base portion is provided at a part of the base portion of the adjustment lever, and an end portion of one tension spring 73a is attached to a position of the extension arm portion that is separated in the width direction from the base portion. By adopting such a configuration, it is possible to apply the same moment to the adjustment lever as that applied to the pressing plate 30a, based on the force that acts from the one tension spring 73a.

In the present example, the present invention is applied to a steering device that includes both a tilt mechanism and a telescopic mechanism; however, the present invention may also be applied to a steering device that includes only a tilt mechanism. In this case, for example, a displacement bracket in which a through hole having a circular cross-sectional shape penetrates in the width direction is provided in an intermediate portion in the axial direction of the steering column instead of the long hole in the front-rear direction, and the adjustment rod is inserted in the width direction through the through hole and the pair of long holes in the up-down direction of the support bracket. In this case as well, due to the presence of one or both of the pair of tension springs, the effect of suppressing the looseness in the width direction of the cam device and the thrust bearing when the clamping force is released, suppressing the vertical vibration (violent motion) of the adjustment lever due to the interference of the smooth displacement of the adjustment rod in the long hole in the up-down direction when adjusting the vertical position of the steering wheel, suppressing the rotation of the driven-side cam caused by the front side surface of the engaging convex portion of the driven-side cam being elastically pressed against the front side edge of the long holes in the up-down direction, or the like, may be obtained.

SECOND EXAMPLE

Figure 16:
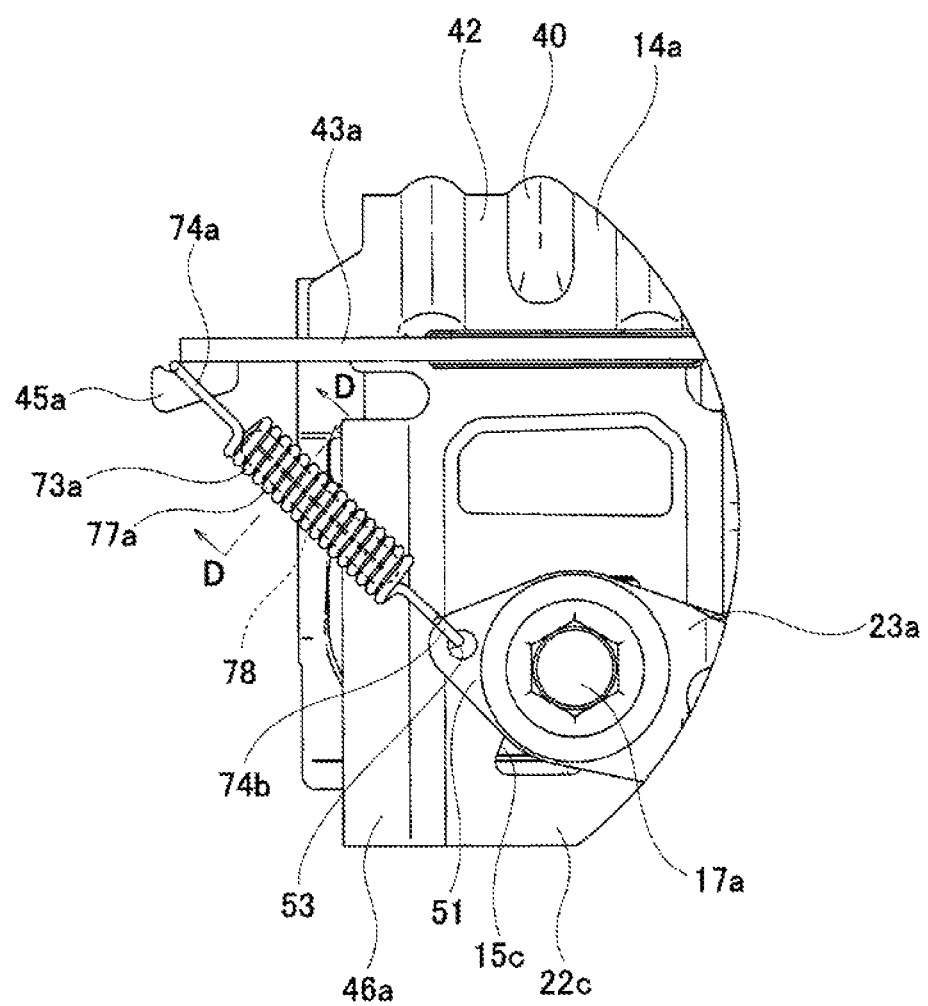
FIG. 16 is a partial cut-away enlarged view of a second example of an embodiment of the present invention, and illustrates a portion corresponding to an intermediate portion in the left-right direction in FIG. 6.
Figure 17:
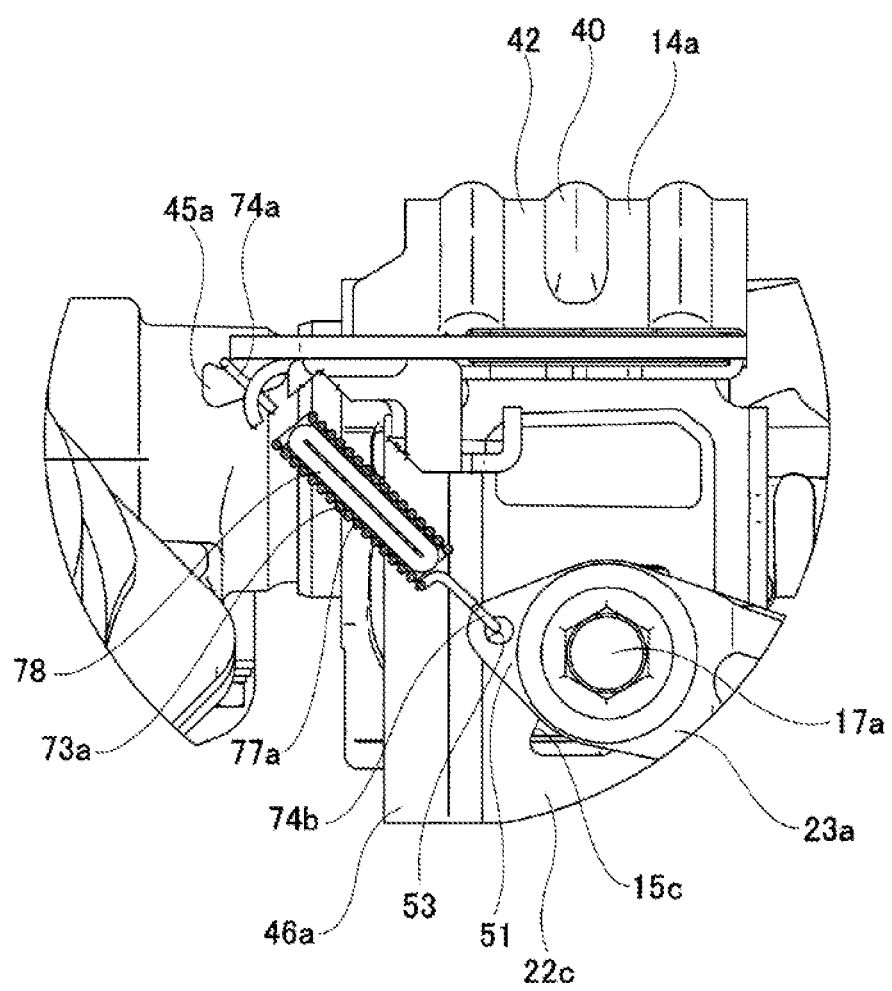
FIG. 17 is a partial enlarged cross-sectional view of the second example, and illustrates a portion corresponding to the intermediate portion in the left-right direction in FIG. 6.
Figure 18:
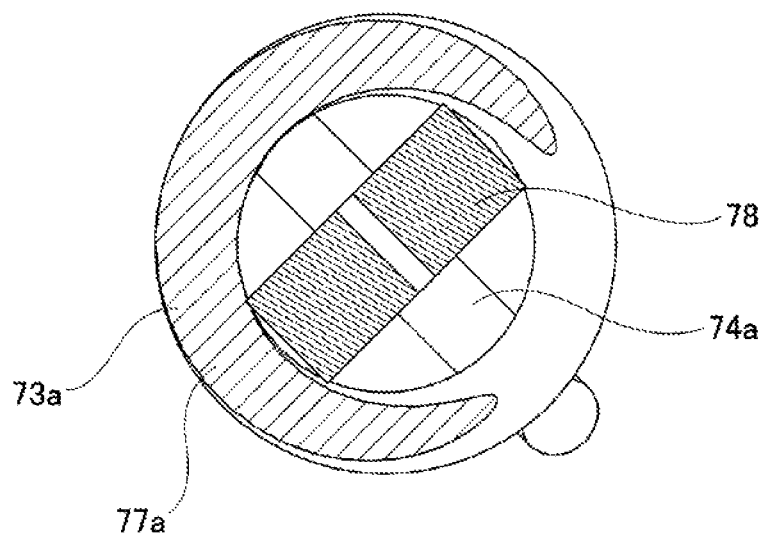
FIG. 18 is a cross-sectional view taken along section line D-D in FIG. 16.

A second example of an embodiment of the present invention will be described with reference to FIGS. 16 to 18. In this example, in order to prevent abnormal noise from being generated from the pair of tension springs 73a, 73b when adjusting the vertical position of the steering wheel 1 or when pivotally operating the adjustment lever 23a, the pair of tension springs 73a, 73b includes a damper member 78 arranged inside the coil portions 77a, 77b.

The damper member 78 is made of an elastic material such as rubber, synthetic resin, or the like, and in the free state has an annular shape as a whole and a substantially rectangular cross-sectional shape. The damper member 78 is arranged inside the coil portions 77a, 77b in a state in which the damper member 78 is deformed. More specifically, the damper member 78 is crushed (folded) to make the portions of the damper member 78 located on opposite sides in the diametrical direction to be close to each other, deforming the entire damper member 78 into a linear shape (plate shape), and in this state, the damper member 78 is inserted so as to be pushed into the inside of the coil portions 77a, 77b. In a state in which the damper member 78 is arranged inside the coil portions 77a, 77b, the outer peripheral surface of the damper member 78 comes in elastic contact with the inner peripheral surfaces of the coil portions 77a, 77b.

The length (folded diameter) of the damper member 78 inside the coil portions 77a, 77b is restricted so that the damper member 78 does not move in the axial direction of the coil portions 77a, 77b and drop from inside the coil portions 77a, 77b as the coil portions 77a, 77b expand and contract when the vertical position of the steering wheel 1 is adjusted or when the adjustment lever 23a is pivotally operated. More specifically, in order to prevent the damper member 78 from dropping from the upper side of the coil portions 77a, 77b, the length of the damper member 78 inside the coil portions 77a, 77b (the engagement allowance) when the upper end portion of the damper member 78 is in contact with the lower surfaces of the locking arm portions 45a, 45b is sufficiently maintained to be longer than the distance from the upper end surfaces of the coil portions 77a, 77b to the lower surfaces of the locking arm portions 45a, 45b, for example. In order to prevent the damper member 78 from dropping off from the lower side of the coil portions 77a, 77b, the length of the damper member 78 (the engagement allowance) inside the coil portions 77a, 77b in a state where the lower end portion of the damper member 78 is in contact with the upper surface of the base portion 51 of the adjustment lever 23a and the locking plate portion 69 (see FIGS. 7 and 13) of the pressing plate 30a is maintained, for example, to be sufficiently longer than the distance from the lower end surfaces of the coil portions 77a, 77b to the upper surface of the base portion 51 of the adjustment lever 23a and the locking plate portion 69 of the pressing plate 30. In this example, the length of the damper member 78, and in particular, the amount of protrusion from the coil portions 77a, 77b is restricted so that the damper member 78 arranged inside the coil portions 77a, 77b is not damaged by the installation jig of the tension springs 73a, 73b during the work of installing the tension springs 73a, 73b.

In this example, when adjusting the vertical position of the steering wheel 1 or when pivotally operating the adjustment lever 23a, it is possible to prevent the coil portions 77a, 77b from generating noises such as popping noise and reverberation sound. In other words, when adjusting the vertical position of the steering wheel 1 or when pivotally operating the adjustment lever 23a, the positions of the spring locking hole 53 of the adjustment lever 23a and the spring locking hole 72 of the pressing plate 30a with respect to the locking arm portions 45a, 45b change. Therefore, there is a possibility that the hook portions 74b, 75b of the tension springs 73a, 73b will move along the inner peripheral edges of the spring locking holes 53, 72, which are both circular holes, and may cause stick slip (fine vibration) to occur. When stick slip occurs, vibration may propagate to the tension springs 73a, 73b, and the coil portions 77a, 77b may generate abnormal noise as speakers. In this example, the damper member 78 that functions as a sound absorbing material is arranged inside the coil portions 77a, 77b, so it is possible to dampen the vibrations of the coil portions 77a, 77b, and it is possible to effectively prevent the coil portions 77a, 77b from generating abnormal noise.

The change in the rotational phase of the pressing plate 30a that occurs when the vertical position of the steering wheel 1 is adjusted is small, so the amount that the hook portion 75b of the tension spring 73b (see FIG. 7) moves along the inner peripheral edge of the spring locking hole 72 of the pressing plate 30a is small. Therefore, it is also possible to adopt a configuration in which the damper member 78 is arranged only inside the coil portion 77a of the one tension spring 73a and not arranged inside the coil portion 77b of the other tension spring 73b. The other configurations and operational effects of this second example are the same as those of the first example.

THIRD EXAMPLE

Figure 19:
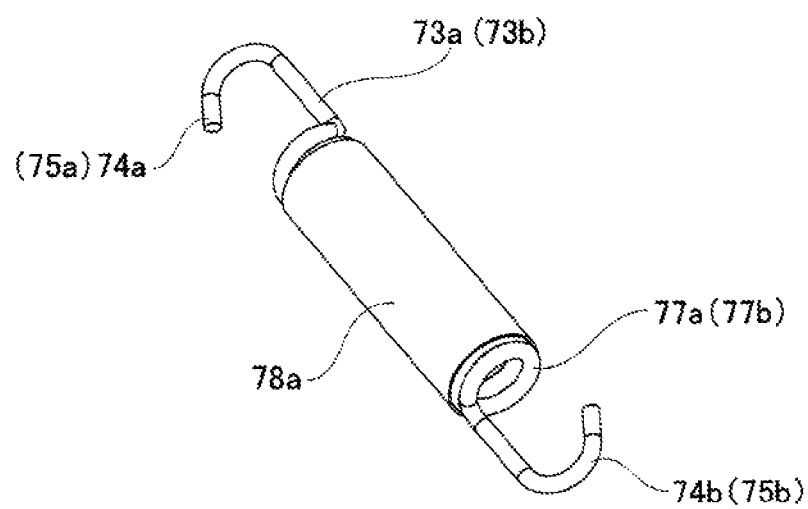
FIGS. 19A and 19B illustrate a tension spring assembled in a steering device of a third example of an embodiment of the present invention; where
Figure 19:
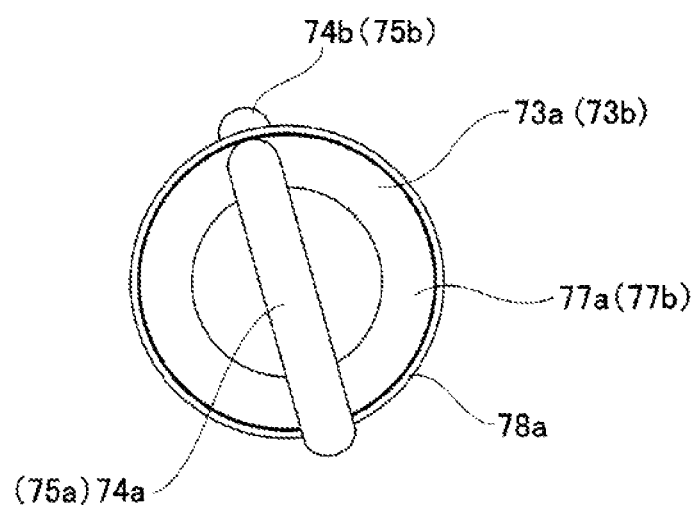

A third example of an embodiment of the present invention will be described with reference to FIG. 19. In this example, the damper member 78a is arranged on the outer side of the coil portions 77a, 77b of the tension springs 73a, 73b. The damper member 78a is made of an elastic material such as rubber, synthetic resin, or the like, and in the free state, has a cylindrical shape having an inner diameter slightly smaller than the outer diameters of the coil portions 77a, 77b. The damper member 78a is externally fitted on the outer side of the coil portions 77a, 77b with the inner diameter thereof being slightly expanded elastically. In a state in which the damper member 78a is arranged on the outer side of the coil portions 77a, 77b, the inner peripheral surface of the damper member 78a comes in elastic contact with the outer peripheral surfaces of the coil portions 77a, 77b.

In this example, the damper member 78a may be visually recognized from the outside, so it is possible to prevent forgetting to attach the damper member 78a. The damper member 78a is externally fitted to the coil portions 77a, 77b, and the hook portions 74a, 74b, 75a, 75b existing on both sides of the coil portions 77a, 77b are locked with the locking arm portions 45a, 45b, the adjustment lever 23a, and the pressing plate 30a, respectively, so the damper member 78a may be effectively prevented from dropping. Other configurations and operational effects of the third example are the same as those of the first and second examples.

FOURTH EXAMPLE

Figure 20:
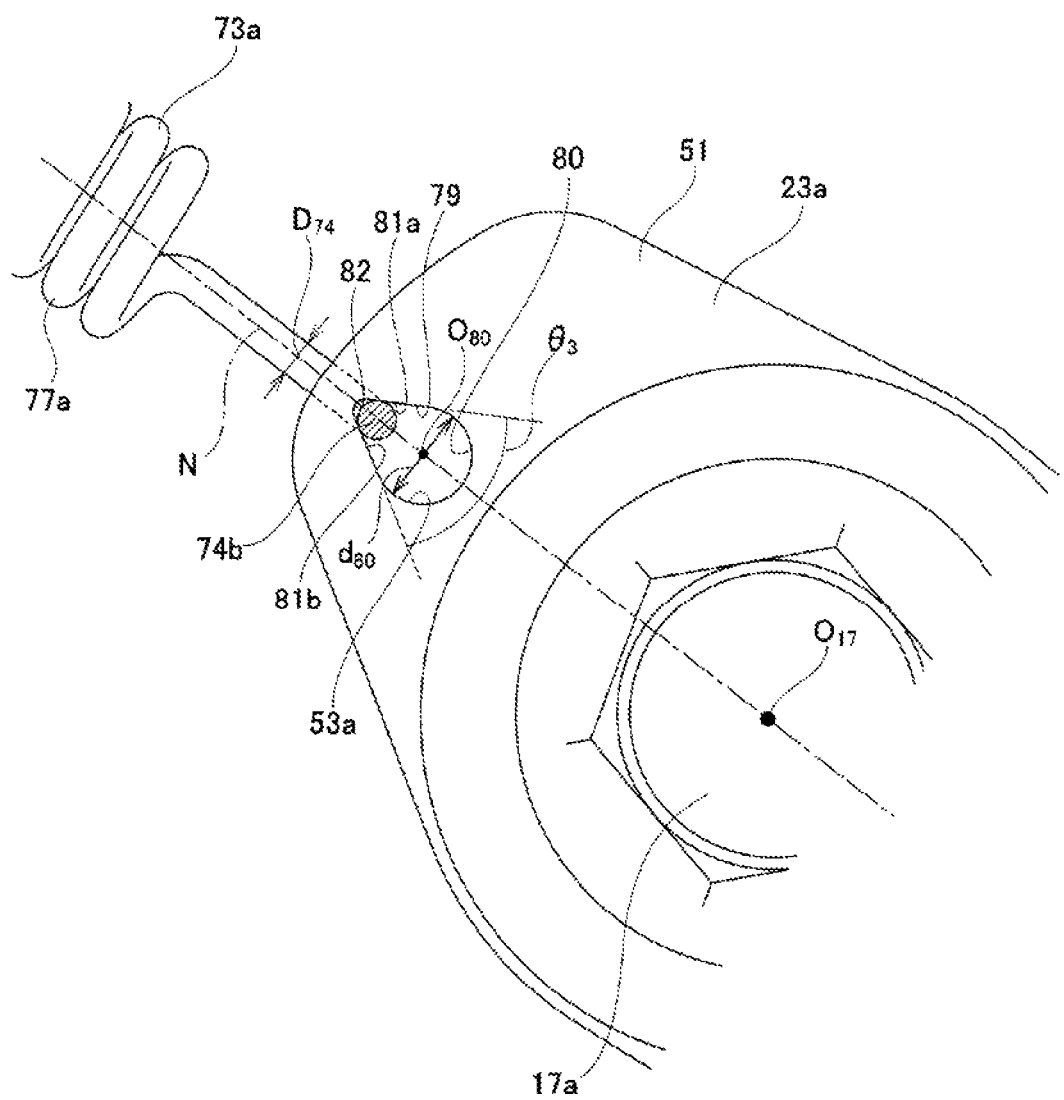
FIG. 20 is a partial cut-away view of a steering device of a fourth example of an embodiment of the present invention, and illustrates a state in which a tension spring is locked to a base portion of an adjustment lever in a pivot position of an adjustment lever in an unlocked state.

A fourth example of an embodiment of the present invention will be described with reference to FIG. 20. In this example, the spring locking hole 53a is not simply a circular hole, but has a substantially teardrop-shaped opening shape that is a combination of a guide hole portion 79 (triangular hole) having a substantially triangular opening shape arranged on the front side (left side in FIG. 20), and a large-diameter hole portion 80 having a substantially semicircular opening shape arranged on the rear side (right side in FIG. 20). The guide hole portion 79 has a pair of linear guide sides 81a, 81b that are inclined toward each other while going toward the front side, and a partial arc-shaped connecting portion 82 that connects the front end portions of the pair of guide sides 81a, 81b. The pair of guide sides 81a, 81b are line-symmetric with respect to an imaginary straight line N that is orthogonal to the center axis $O_{17}$ of the adjustment rod 17a and that passes through the central portion in the circumferential direction of the connecting portion 82. Moreover, the center $O_{80}$ of the large-diameter hole portion 80 is located on the imaginary straight line N. The inner diameter $d_{80}$ of the large-diameter hole portion 80 is sufficiently larger than the wire diameter $D_{74}$ of the hook portion 74b of the tension spring 73a ($d_{80} > D_{74}$). The radius of curvature of the connecting portion 82 is smaller than one half of the wire diameter $D_{74}$ of the hook portion 74b. The size of the angle θ3 between the pair of guide sides 81a, 81b is determined in consideration of the wire diameter $D_{74}$ of the hook portion 74b, the shape of the base portion 51, and the like, and for example, is set in the range of 30 to 90 degrees, and preferably is set in the range of 45 degrees to 75 degrees. Note that in the illustrated example, the angle θ3 is 60 degrees.

In a state in which the hook portion 74b is locked in the spring locking hole 53a, the hook portion 74b is pulled by the elastic restoring force exerted by the coil portion 77a in a direction in which the spacing of the pair of guide sides 81a, 81b become smaller, which is a direction going toward the connecting portion 82. Accordingly, the hook portion 74b is elastically pressed between the pair of guide sides 81a, 81b (bites like a wedge), and is elastically pressed against the pair of guide sides 81a, 81b. There are gaps between both the hook portion 74b and the connecting portion 82, and between the hook portion 74b and the large-diameter hole portion 80. In other words, the hook portion 74b only comes in contact with the pair of guide sides 81a, 81b. Moreover, the inner diameter $d_{80}$ of the large-diameter hole portion 80 is sufficiently larger than the wire diameter $D_{74}$ of the hook portion 74b, so the hook portion 74b may be loosely inserted into the large-diameter hole portion 80.

In this example, in a state in which the hook portion 74b of the tension spring 73a is locked in the spring locking hole 53a of the adjustment lever 23a, the hook portion 74b is elastically pushed between the pair of guide sides 81a, 81b due to the elastic restoring force exerted by the coil portion 77a, and it is elastically pressed against the pair of guide sides 81a, 81b. Therefore, even when the vertical position of the steering wheel 1 is adjusted or the adjustment lever 23a is pivotally operated, the movement of the hook portion 74b is restricted by the pair of guide sides 81a, 81b, and it is possible to prevent movement (sliding) along the inner peripheral edge of the spring locking hole 53a. With this configuration, it is possible to prevent the contact position between the hook portion 74b and the pair of guide sides 81a, 81b from changing even when the vertical position of the steering wheel 1 is adjusted or the adjustment lever 23a is pivotally operated, so it is possible to suppress the occurrence of stick slip between the tension spring 73a and the adjustment lever 23a.

Moreover, the inner diameter $d_{80}$ of the large-diameter hole portion 80 is made sufficiently larger than the wire diameter $D_{74}$ of the hook portion 74b, so the hook portion 74b may be loosely inserted into the large-diameter hole portion 80. Therefore, the hook portion 74b may be easily inserted into the spring locking hole 53a, so the workability of the work for assembling the steering device may be ensured. The other configurations and operational effects of the fourth example are the same as those of the first to third examples.

FIFTH EXAMPLE

Figure 21:
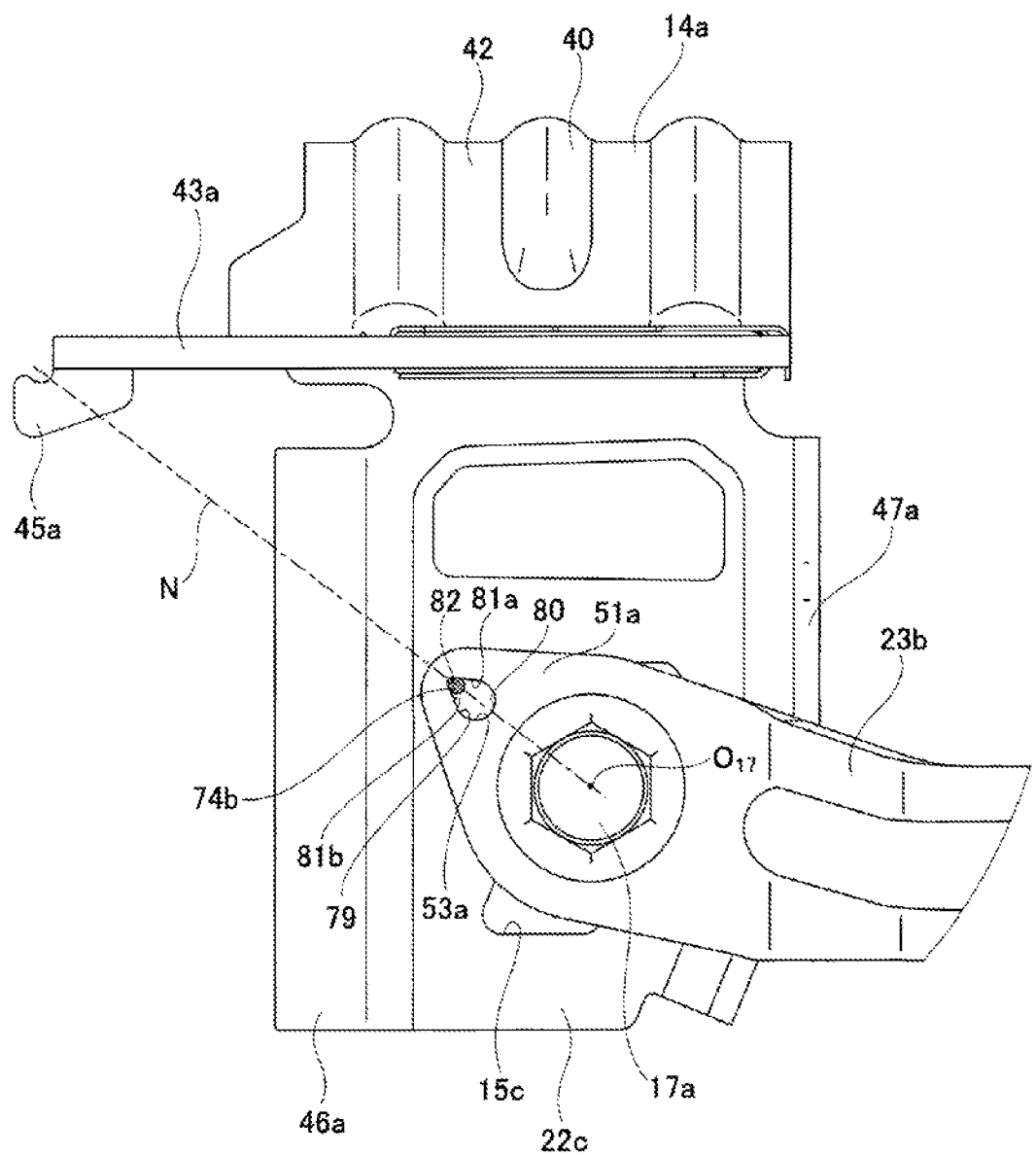
FIG. 21 is a partial cut-away view of a steering device of a fifth example of an embodiment of the present invention, and illustrates a state in which a tension spring is locked to a base portion of an adjustment lever in a pivot position of an adjustment lever in an unlocked state.

A fifth example of an embodiment of the present invention will be described with reference to FIG. 21. In this example, the shape of the base portion 51a of the adjustment lever 23b is changed from the structure of the fourth example. More specifically, the front side portion of the base portion 51a has a substantially triangular tapered shape, and an imaginary straight line N that is orthogonal to the center axis $O_{17}$ of the adjustment rod 17a passes through the central portion in the circumferential direction of the connecting portion 82 passes through the top of the base portion 51a.

In the case of this example as well, the hook portion 74b of the tension spring 73a is elastically pushed between the pair of guide sides 81a, 81b of the guide hole portion 79 having a substantially triangular opening shape. Therefore, the hook portion 74b may be prevented from moving along the inner peripheral edge of the spring locking hole 53a, and the occurrence of stick slip may be suppressed. The other configurations and operational effects of the fifth example are the same as those of the fourth example.

SIXTH EXAMPLE

Figure 22:
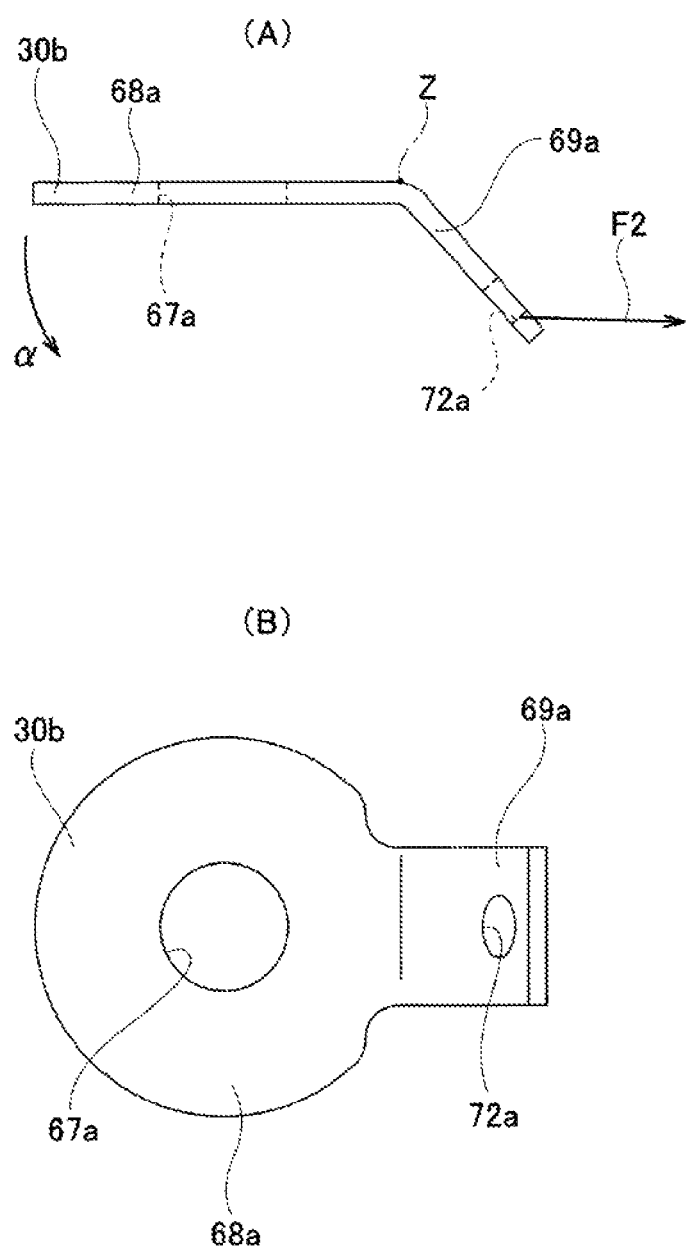
FIGS. 22A and 22B illustrate a pressing plate assembled in a steering device of a sixth example of an embodiment of the present invention, where

A sixth example of an embodiment of the present invention will be described with reference to FIGS. 22A and 22B. The pressing plate 30b used in this example includes: a ring-shaped plate main body 68a that has an insertion hole 67a for inserting the adjustment rod 17a and is externally fitted on the adjustment rod 17a; and a flat plate-shaped locking plate portion 69a arranged at one location in the circumferential direction on the outer peripheral edge of the plate main body 68a. The locking plate portion 69a diagonally extends from the outer peripheral edge portion of the plate main body 68a in a direction toward the front side (the outer side in the radial direction of the plate main body 68) while going toward the outer side in the width direction (the axial direction of the plate main body 68). The locking plate portion 69a includes a spring locking hole 72a for locking the end portion of the other tension spring 73b at a position separated (offset) in the width direction from the plate main body 68a.

In the case of this example as well, a moment may be applied to the pressing plate 30b based on the force acting on the pressing plate 30b from the other tension spring 73b. In other words, the end portion of the other tension spring 73b is locked in the spring locking hole 72a arranged at a position of the locking plate portion 69a that is separated in the width direction with respect to the plate main body 68a that is externally fitted on the adjustment rod 17a. Therefore, based on the force F2 acting on the pressing plate 30b from the other tension spring 73b, a moment in the direction of the arrow a acts around a imaginary straight line Z extending in the extending direction of the bent portion between the plate main body 68a and the base end of the locking plate portion 69a with the bent portion as a fulcrum. Therefore, the plate main body 68a is able to apply forces to the outer-side surface of the other support plate portion 22d and the inner-side surface of the thrust bearing 29a in directions away from each other. The other configurations and operational effects of the sixth example are the same as those of the first example.

When implementing the present invention, the structures of the respective examples may be appropriately combined and implemented as long as there is no contradiction.

REFERENCE SIGNS LIST

1 Steering wheel
2 Steering gear unit
3 Input shaft
4 Tie rod
5, 5a Steering shaft
6, 6a Steering column
7 Universal joint
8 Intermediate shaft
9 Universal joint
10, 10a Gear housing
11 Vehicle body
12, 12a Tilt shaft
13, 13a Displacement bracket
14, 14a Support bracket
15a, 15b, 15c, 15d Long hole in the up-down direction
16a, 16b, 16c, 16d Long hole in the front-rear direction
17, 17a Adjustment rod
18, 18a Outer column
19, 19a Inner column
20, 20a Slit
21a, 21b, 21c, 21d Clamped plate portion
22a, 22b, 22c, 22d Support plate portion
23, 23a, 23b Adjustment lever
24, 24a Cam device
25, 25a Driving-side cam
26, 26a Driven-side cam
27, 27a Engaging convex portion
28, 28a Nut
29, 29a Thrust bearing
30, 30a, 30b Pressing plate
31 Spring
32 Lower bracket
33 Inner shaft
34 Outer shaft
35 Clamped portion
36 Tubular portion
37 Column fitting portion
38a, 38b Lower hole
39a, 39b Sleeve
40 Installation plate portion
41 Locking capsule
42 Bridge portion
43a, 43b Side plate portion
44 Rib
45a, 45b Locking arm portion
46a, 46b Reinforcing ridge
47a, 47b Bending plate portion
48 Head portion
49 Male screw portion
50 Disc spring
51, 51a Base portion
52 Installation hole
53, 53a Spring locking hole
54 Center hole
55 Driving-side cam surface 56 Fitting convex portion
57 Driving-side base bottom surface
58 Driving-side convex portion
59 Driving-side stopper surface
60 Driving-side inclined guiding surface
61 Center hole
62 Driven-side cam surface
63 Driven-side base bottom surface
64 Driven-side convex portion
65 Driven-side inclined guiding surface
66 Driven-side stopper surface
67, 67a Insertion hole
68, 68a Plate main body
69, 69a Locking plate portion
70 Base half portion
71 Front half portion
72, 72a Spring locking hole
73a, 73b Tension spring
74a, 74b Hook portion
75a, 75b Hook portion
76a, 76b, 76c Gap
77a, 77b Coil portion
78, 78a Damper member
79 Guide hole portion
80 Large-diameter hole portion
81a, 81b Guide side
Connecting portion

The invention claimed is:

1. A steering device comprising:
a steering column having a tubular shape and capable of pivotal displacement about a tilt shaft arranged in a width direction with respect to a vehicle body or a member that may be fixed to the vehicle body;
a displacement bracket provided in a part of the steering column and having a column-side through hole penetrating in the width direction;
a support bracket having: an installation plate portion; a pair of support plate portions connected to the installation plate portion and arranged on both sides in the width direction of the displacement bracket; and a pair of long holes in an up-down direction extending in the up-down direction;
an adjustment rod inserted in the width direction through the column side through hole and the pair of long holes in the up-down direction;
a cam device having a driving-side cam and a driven-side cam and arranged on one end side of the adjustment rod around a portion protruding from an outer-side surface of one support plate portion of the pair of support plate portions; and
an adjustment lever having a base portion fixed to the driving-side cam;
the driven-side cam comprising an engaging convex portion on an inner-side surface thereof, and the engaging convex portion engaging with one long hole in the up-down direction of the pair of long holes in the up-down direction and capable of displacing along the one long hole in the up-down direction;
a pair of tension springs arranged on both outer sides in the width direction of the pair of support plate portions;
one tension spring of the pair of tension springs spanning between the support bracket and the base portion of the adjustment lever;
the other tension spring of the pair of tension springs spanning between the support bracket and a locked portion provided on a portion of the other end side of the adjustment rod that protrudes from the outer-side surface of the other support plate portion of the pair of support plate portions;
the pair of tension springs, in a state in which the adjustment lever is pivotally operated in a direction to reduce a dimension in the width direction of the cam device, applying forces having a magnitude identical to each other to the base portion of the adjustment lever and the locked portion in acting directions directed diagonally upward toward a front at identical angles with respect to a center axis of the steering column; and
a front side surface of the engaging convex portion pressed against a front side edge of the one long hole in the up-down direction.

2. The steering device according to claim 1, wherein
the steering column has: an inner column, and an outer column arranged on a rear side of the inner column and fitted to the inner column so as to be capable of relative displacement in an axial direction;
a part of the steering column is composed of a part of the outer column; and
the column-side through hole is configured by a long hole in a front-rear direction extending in the front-rear direction.

3. The steering device according to claim 1, wherein
the acting direction is directed further upward than a direction of an imaginary straight line orthogonal to the tilt shaft and the adjustment rod.

4. The steering device according to claim 1, wherein
the pair of tension springs is configured by coil springs comprising a coil portion, and at least one of the tension springs comprises a damper member on an inner side or an outer side of the coil portion.

* * * * *